(12) United States Patent
Mori

(10) Patent No.: US 9,671,961 B2
(45) Date of Patent: Jun. 6, 2017

(54) MEMORY CONTROLLER, STORAGE APPARATUS, INFORMATION PROCESSING SYSTEM, AND CONTROL METHOD FOR THE SAME

(71) Applicant: Sony Corporation, Tokyo (JP)

(72) Inventor: Kentarou Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 14/656,941

(22) Filed: Mar. 13, 2015

(65) Prior Publication Data
US 2015/0268859 A1 Sep. 24, 2015

(30) Foreign Application Priority Data

Mar. 24, 2014 (JP) .................................. 2014-059622

(51) Int. Cl.
*G06F 3/06* (2006.01)
*G06F 13/16* (2006.01)
*G06F 12/02* (2006.01)

(52) U.S. Cl.
CPC ............ *G06F 3/061* (2013.01); *G06F 3/0659* (2013.01); *G06F 3/0688* (2013.01);
(Continued)

(58) Field of Classification Search
CPC ........ G06F 3/061; G06F 13/16; G06F 3/0688; G06F 3/0659; G06F 12/023; G06F 2212/1044
See application file for complete search history.

(56) References Cited

U.S. PATENT DOCUMENTS 6,636,942 B2 * 10/2003 Greco .................... G06F 3/061 711/112
6,671,791 B1 * 12/2003 McGrath ............. G06F 12/1009 711/206

(Continued)

FOREIGN PATENT DOCUMENTS

JP 2011-186562 9/2011

OTHER PUBLICATIONS

Webopedia, "TLB", Aug. 3, 2004, pp. 1 - 2, https://web.archive.org/web/20040803163723/http://www.webopedia.com/TERM/T/TLB.html.*

(Continued)

*Primary Examiner* — Christopher D Birkhimer
(74) *Attorney, Agent, or Firm* — Michael Best & Friedrich LLP

(57) ABSTRACT

There is provided a memory controller that includes an address conversion information buffer that stores address conversion information about a correlation between logical and physical addresses, the physical address including a memory area number, an address conversion section that converts the logical address into the physical address in accordance with the address conversion information, the logical address being in a command issued by a host computer, an allocation information storage section that stores allocation information indicating a correlation between an access size and the memory area number, a memory identification section that outputs the memory area number in accordance with the allocation information, the memory area number corresponding to the access size in the command, and a control section that performs, when the memory area number in the physical address is different from the one identified by the memory identification section, data writing to the identified memory area.

8 Claims, 20 Drawing Sheets

(52) U.S. Cl.
CPC ............ *G06F 12/023* (2013.01); *G06F 13/16* (2013.01); *G06F 2212/1044* (2013.01)

(56) References Cited

U.S. PATENT DOCUMENTS

| | | | | |
|---|---|---|---|---|
| 7,552,293 | B2* | 6/2009 | Van Riel | G06F 12/023 711/159 |
| 7,599,972 | B2* | 10/2009 | Dodge | G06F 3/0608 |
| 7,802,070 | B2* | 9/2010 | Cholleti | G06F 12/023 711/147 |
| 8,190,914 | B2* | 5/2012 | van Riel | G06F 12/08 709/216 |
| 8,631,250 | B2* | 1/2014 | Van Riel | G06F 12/08 709/216 |
| 2003/0188114 | A1* | 10/2003 | Lubbers | G06F 11/2058 711/162 |
| 2007/0204117 | A1* | 8/2007 | Van Riel | G06F 12/023 711/159 |
| 2007/0208954 | A1* | 9/2007 | Van Riel | G06F 12/08 713/193 |
| 2007/0283125 | A1* | 12/2007 | Manczak | G06F 11/3466 711/207 |
| 2007/0288719 | A1* | 12/2007 | Cholleti | G06F 12/023 711/170 |
| 2008/0052329 | A1* | 2/2008 | Dodge | G06F 3/0608 |
| 2009/0228665 | A1* | 9/2009 | Van Riel | G06F 12/023 711/154 |
| 2009/0228675 | A1* | 9/2009 | van Riel | G06F 12/023 711/170 |
| 2010/0106872 | A1* | 4/2010 | Moyer | G06F 9/3004 710/100 |
| 2012/0185953 | A1* | 7/2012 | Van Riel | G06F 12/08 726/32 |
| 2013/0275703 | A1* | 10/2013 | Schenfeld | G06F 12/0292 711/165 |
| 2013/0275707 | A1* | 10/2013 | Schenfeld | G06F 12/0292 711/165 |

OTHER PUBLICATIONS

Charles C. Lin, "Virtual Memory", 2003, pp. 1-9, https://www.cs.umd.edu/class/sum2003/cmsc311/Notes/Memory/virtual.html.*

* cited by examiner

MEMORY CONTROLLER, STORAGE APPARATUS, INFORMATION PROCESSING SYSTEM, AND CONTROL METHOD FOR THE SAME

CROSS REFERENCE TO RELATED APPLICATIONS

This application claims the benefit of Japanese Priority Patent Application JP 2014-059622 filed Mar. 24, 2014, the entire contents of which are incorporated herein by reference.

BACKGROUND

The present disclosure relates to memory controllers and, more specifically, to a memory controller for allocation of a plurality of nonvolatile memory areas for writing of data, a storage apparatus, an information processing system, and a control method therefor.

The previous storage apparatus includes a plurality of memories for combined use aiming for better performance. In order to improve the performance, such a storage apparatus has been making an attempt to perform memory allocation differently for writing of data. That is, when the storage apparatus uses a NAND flash memory and a DRAM (Dynamic Random Access Memory), for example, the DRAM is written with very-frequently-accessed data, and the NAND flash memory is written with any other data.

This memory allocation aims to improve the performance by utilizing the characteristics of the DRAM, i.e., allowing high-speed access.

A nonvolatile memory including the above-mentioned NAND flash memory has limited rewrite cycles compared with the DRAM, and thus has a limited life as a memory. In consideration thereof, for improving the performance of the storage apparatus including a plurality of nonvolatile memories, proposed is to increase the life of the nonvolatile memories. As an example, Japanese Patent Application Laid-open No. 2011-186562 (hereinafter, referred to as Patent Document 1) describes a memory management apparatus that performs memory allocation for data writing based on information about erase cycles of memories, characteristics of data for writing, and others.

SUMMARY

With the above-mentioned Patent Document 1, however, the memory allocation is performed with no consideration to the size of writing data in commands issued by a host computer, i.e., no consideration to the access size. This may cause a write process to be performed mainly on a specific memory if a plurality of write commands is issued with various access sizes. If this is the case, the processing time may vary among the memories, thereby resulting in a problem of increasing the time for the write process with all of the commands.

It is thus desirable to prevent the write process from being mainly performed on a specific memory, and to reduce the time for the write process by performing memory allocation with consideration to the access size.

According to an embodiment of the present disclosure, there is provided a memory controller that includes an address conversion information buffer, an address conversion section, an allocation information storage section, a memory identification section, and a control section. The address conversion information buffer is configured to store address conversion information, the address conversion information being about a correlation between a logical address and a physical address, the physical address including the number of a memory area for data writing. The address conversion section is configured to convert the logical address into the physical address in accordance with the address conversion information, the logical address being included in a command issued by a host computer. The allocation information storage section is configured to store allocation information, the allocation information indicating a correlation between an access size and the number of the memory area for the data writing. The memory identification section is configured to output the number of the memory area for the data writing in accordance with the allocation information, the number of the memory area corresponding to the access size in the command. The control section is configured to, when the number of the memory area in the physical address is different from the number of the memory area provided by the memory identification section, perform the data writing to the memory area identified by the memory identification section. Such a memory controller produces an effect of allowing data writing to the memory areas allocated based on an access size.

Also in the embodiment, the memory controller may further include a frequency information buffer, and an allocation information generation section. The frequency information buffer is configured to store access frequency information, the access frequency information indicating an access frequency with each access size. The allocation information generation section is configured to generate the allocation information for storage in the allocation information storage section, the allocation information being generated based on the access size and the access frequency information. Such a memory controller produces an effect of performing memory area allocation based on an access frequency with each access size.

Also in the embodiment, the memory controller may further include a measurement section configured to generate the access frequency information for storage in the frequency information buffer, the access frequency information being generated by measuring an access-size-based command ratio with respect to the total number of the command and a plurality of commands asking for the data writing. Such a memory controller produces an effect of allowing a dynamic response even if the access frequency shows a change.

According to another embodiment of the present disclosure, there is provided a storage apparatus that includes a memory module including a plurality of memory areas, and a memory controller. The memory controller includes an address conversion information buffer, an address conversion section, an allocation information storage section, a memory identification section, and a control section. The address conversion information buffer is configured to store address conversion information, the address conversion information being about a correlation between a logical address and a physical address, the physical address including the number of any of the memory areas in the memory module. The address conversion section is configured to convert the logical address into the physical address in accordance with the address conversion information, the logical address being included in a command issued by a host computer. The allocation information storage section is configured to store allocation information, the allocation information indicating a correlation between an access size and the number of each of the memory areas. The memory identification section is configured to output any of the numbers of the memory areas in accordance with the allocation information, the number of the memory area corresponding to the access size in the command. The control section is configured to, when the number of the memory area in the physical address is different from the number of the memory area provided by the memory identification section, perform data writing to the memory area identified by the memory identification section. Such a storage apparatus produces an effect of allowing, in a memory module including a plurality of memory areas, data writing to the memory areas allocated based on an access size.

According to still another embodiment of the present disclosure, there is provided an information processing system that includes a memory module including a plurality of memory areas, a host computer issuing a command to a memory controller, and the memory controller.

The memory controller includes an address conversion information buffer, an address conversion section, an allocation information storage section, a memory identification section, and a control section. The address conversion information buffer is configured to store address conversion information, the address conversion information being about a correlation between a logical address and a physical address, the physical address including a number of any of the memory areas. The address conversion section is configured to convert the logical address into the physical address in accordance with the address conversion information, the logical address being included in the command issued by the host computer. The allocation information storage section is configured to store allocation information, the allocation information indicating a correlation between an access size and the number of each of the memory areas. The memory identification section is configured to output any of the numbers of the memory areas in accordance with the allocation information, the number of the memory area corresponding to the access size in the command issued by the host computer. The control section is configured to, when the number of the memory area in the physical address is different from the number of the memory area provided by the memory identification section, perform the data writing to the memory area identified by the memory identification section. Such an information processing system produces an effect of allowing, in a memory module including a plurality of memory areas, data writing to the memory areas allocated based on an access size.

Also in this embodiment, the memory controller may further include a frequency information buffer, an allocation information generation section, and a measurement section. The frequency information buffer is configured to store access frequency information, the access frequency information indicating an access frequency with each of the access size and a plurality of access sizes. The allocation information generation section is configured to generate the allocation information for storage in the allocation information storage section, the allocation information being generated based on the access sizes and the access frequency information. The measurement section is configured to generate the access frequency information for storage in the frequency information buffer, the access frequency information being generated by measuring an access-size-based command ratio with respect to the total number of the command and a plurality of commands asking for data writing. Such a memory controller produces an effect of allowing, in a memory module including a plurality of memory areas, a dynamic response even if the access frequency shows a change.

Also in this embodiment, the memory controller may further include a frequency information buffer, and an allocation information generation section, and the host computer may include a measurement section. The frequency information buffer is configured to store the access frequency information, the access frequency information indicating an access frequency with each of the access sizes. The allocation information generation section is configured to generate the allocation information for storage in the allocation information storage section, the allocation information being generated based on the access sizes and the access frequency information. The measurement section is configured to generate the access frequency information for storage in the frequency information buffer, the access frequency information being generated by measuring an access-size-based command ratio with respect to the total number of the command and a plurality of commands asking for data writing. Such an information processing system produces an effect of allowing, in a memory module including a plurality of memory areas, a dynamic response even if the access frequency shows a change.

According to still another embodiment of the present disclosure, there is provided a memory control method that includes converting a logical address into a physical address in accordance with address conversion information, the address conversion information being about a correlation between the logical address and the physical address, the physical address including the number of a memory area for data writing, the logical address being included in a command issued by a host computer, outputting the number of the memory area for the data writing in accordance with allocation information, the allocation information indicating a correlation between an access size and the number of the memory area for the data writing, the number of the memory area corresponding to the access size in the command, and performing, when the number of the memory area in the physical address is different from the number of the memory area in the output, the data writing to the memory area identified by the output. Such a memory control method produces an effect of allowing data writing to the memory areas allocated based on an access size.

According to the embodiments of the present disclosure, even if a host computer issues a plurality of commands with various access sizes for data writing, the processing time may not vary among memory areas. This accordingly produces an excellent effect of reducing the time for a write process with all of the commands. While the effect has been described, the foregoing description is in all aspects illustrative and not restrictive, and may be any of this and other effects described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure (hereinafter, simply referred to as embodiments) will be described with reference to the drawings. For the description of the embodiments, terms are defined as below. That is, a memory chip denotes a memory including at least a memory area, and a memory interface. A memory bank denotes a memory in a memory chip including a memory area, and a memory interface being operable independently therefrom. A memory module denotes a memory including one or more memory chips. The description is given in the following order.

1. First Embodiment (example of using a memory module including two memory chips)

2. Second Embodiment (example of using a memory module including four memory chips)

3. Third Embodiment (example of using a memory module that includes a memory chip with two memory banks)

4. Fourth Embodiment (example of using a memory module that includes two memory chips each with two memory banks)

5. Fifth Embodiment (example of using a memory module that includes two memory chips different in type)

6. Sixth Embodiment (example of dynamically changing access frequency information)

7. Seventh Embodiment (example of receiving access frequency information from a host computer)

8. Modified Example

1. First Embodiment

Figure 1:
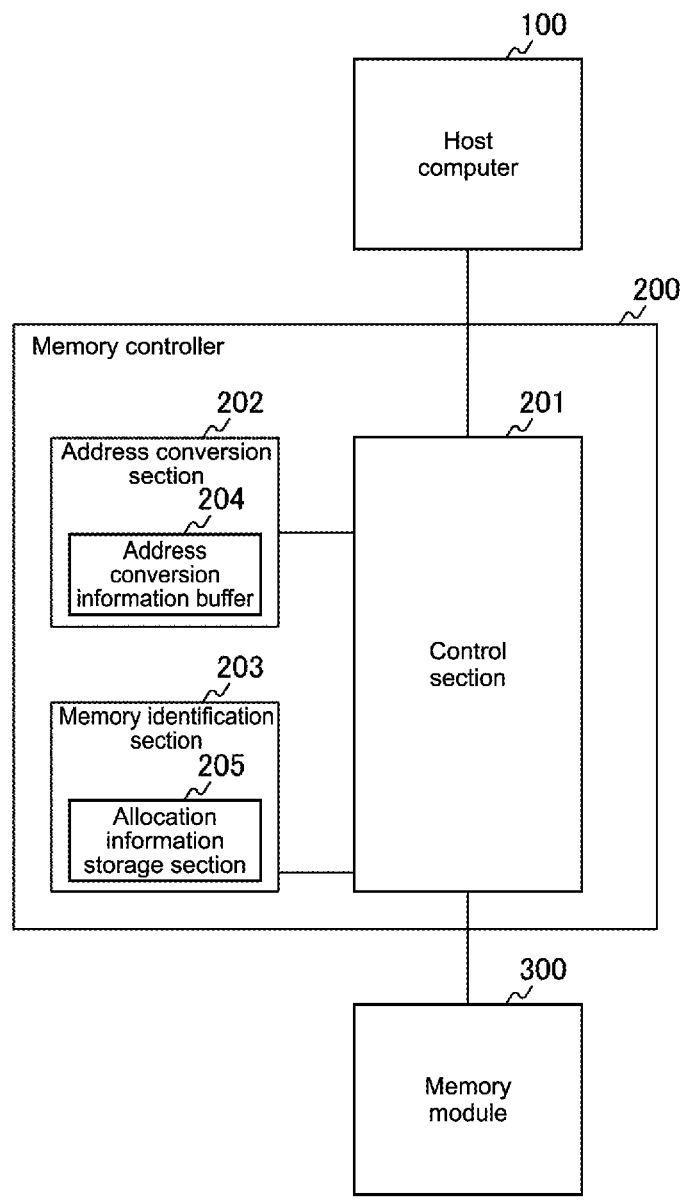
FIG. 1 is a diagram showing an exemplary function configuration of an information processing system in a first embodiment of the present disclosure.

FIG. 1 is a diagram showing an exemplary function configuration of an information processing system in a first embodiment of the present disclosure. The information processing system in the first embodiment includes a host computer 100, a memory controller 200, and a memory module 300.

The host computer 100 is for data input/output to/from the memory module 300 via the memory controller 200. The host computer 100 performs data input/output by issuing a command to the memory controller 200 for data writing or reading. The host computer 100 includes a processor, a ROM (Read Only Memory), a RAM (Random Access Memory), and others (all not shown).

The memory controller 200 is for controlling the memory module 300 based on the command issued by the host computer 100. This memory controller 200 includes a control section 201, an address conversion section 202, and a memory identification section 203. The control section 201 is for controlling the component blocks in the memory controller 200. This control section 201 serves as an interface between the host computer 100 and the memory module 300. To be specific, the control section 201 performs processing of address conversion or others on the command issued by the host computer 100, and then issues a request with respect to the memory module 300.

The address conversion section 202 is for converting a logical address into a physical address. The logical address is an address in the command issued by the host computer 100, and the physical address is an address in a memory chip in the memory module 300. Herein, the physical address includes a memory area number for identifying the memory chip. The above-mentioned address conversion is performed in accordance with address conversion information, which indicates the correlation between the logical address and the physical address. The data size for each address conversion, i.e., address conversion unit, is the minimum size of data to be exchanged with the memory module 300. The address conversion information is stored in an address conversion information buffer 204.

The memory identification section 203 is for outputting the memory area number of a data-writing memory area corresponding to the access size of a command issued by the host computer 100 to ask for data writing. This output is performed in accordance with allocation information that indicates the correlation between the access size and the memory area number of the data-writing memory area. This allocation information is stored in an allocation information storage section 205. Herein, the access size indicates the size of data asked by the command for writing or reading, and is an integral multiple of the data size for the address conversion by the above-mentioned address conversion section 202.

The memory controller 200 also performs alternate processing when any write error occurs, or processing of wear levelling, for example.

The control section 201 is an example of a control section claimed in Claims. The address conversion section 202 is an example of an address conversion section claimed in Claims. The memory identification section 203 is an example of a memory identification section claimed in Claims. The address conversion information buffer 204 is an example of an address conversion information buffer claimed in Claims. The allocation information storage section 205 is an example of an allocation information storage section claimed in Claims.

The memory module 300 includes a plurality of memory chips. This memory module 300 is described by referring to FIG. 2.

Figure 2:
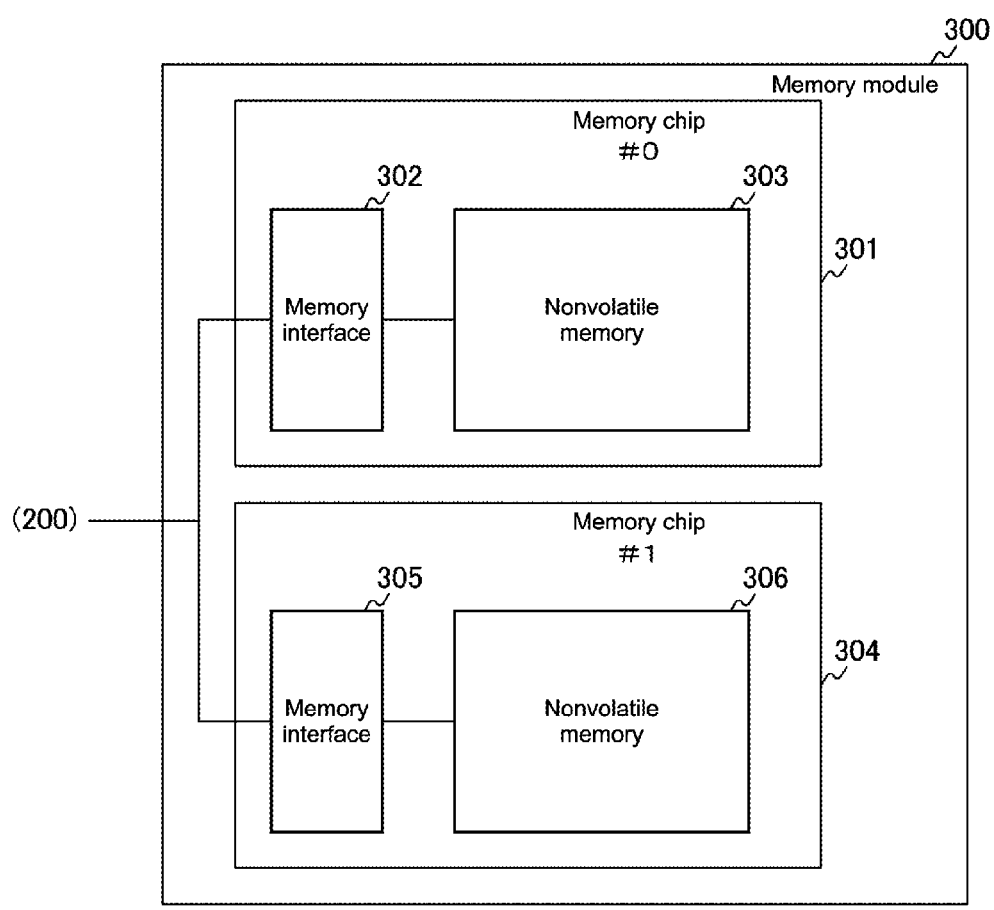
FIG. 2 is a diagram showing an exemplary configuration of a memory module in the first embodiment of the present disclosure.

FIG. 2 is a diagram showing an exemplary configuration of the memory module in the first embodiment of the present disclosure. The memory module 300 includes memory chips 301 and 304 that are in the same configuration. The memory chip 301 includes a memory interface 302, and a nonvolatile memory 303. The memory chip 304 includes a memory interface 305, and a nonvolatile memory 306. The memory interfaces 302 and 305 each communicate with the memory controller 200. To be specific, the memory interfaces 302 and 305 perform writing and reading of data by respectively controlling the nonvolatile memories 303 and 306 in response to a request issued by the memory controller 200.

The nonvolatile memories 303 and 306 are each exemplified by a NAND flash memory, a PCRAM (Phase-Change RAM), an MRAM (Magnetoresistive RAM), or a ReRAM (Resistance RAM).

The interface for use between the host computer 100 and the memory controller 200, and the interface for use between the memory controller 200 and the memory module 300 may include a SATA (Serial Advanced Technology Attachment), PCI (Peripheral Component Interconnect) Express, eMMC (embedded Multi-Media Card), USB (Universal Serial Bus), or others.

The memory controller 200 identifies the memory chips 301 and 304 using the above-mentioned memory area numbers, and issues a request. Herein, the memory area numbers are numbers or addresses for use by the memory controller 200 to identify the memory chips. When the interface in use is USB, the memory area numbers correspond to the addresses assigned to the memory chips 301 and 304, respectively. In this embodiment, the memory chips 301 and 304 are respectively assigned the memory area numbers of #0 and #1.

[Memory Area Allocation]

In the first embodiment of the present disclosure, the access size includes only 4 KB and 16 KB. Using an access frequency corresponding to the access size, the memory chip allocation for writing of data is performed. The access frequency indicates how often a command asking for the above-mentioned access-size-based data writing is generated. In the first embodiment, the access frequency is assumed to be 80% with the access size of 4 KB, and to be 20% with the access size of 16 KB.

Described next is allocation of the memory chips 301 and 304 for writing of data with the access sizes of 4 KB and 16 KB, respectively. For the allocation, the product of the access size and the access frequency is defined as a memory occupation percentage, and the memory chips are so allocated as to have the same memory occupation percentage. As described above, the access frequency is 80% with the access size of 4 KB, and is 20% with the access size of 16 KB. Therefore, the memory occupation percentage being the product of the access size and the access frequency shows the ratio of 1:1 in order of access size. Herein, since two memory chips are in use, a command with the access size of 4 KB is assigned to one of the memory chips, and a command with the access size of 16 KB is assigned to the remaining memory chip so that the memory chips may have the same memory occupation percentage. In the first embodiment, a command with the access size of 4 KB is assigned to the memory chip 301 (memory area #0), and a command with the access size of 16 KB is assigned to the memory chip 304 (memory area #1).

This is the defined allocation information, and is stored in the allocation information storage section 205.

Described next is the operation of the memory controller 200 in the above embodiment by referring to the drawing.

[Procedure of Write Process]

Figure 3:
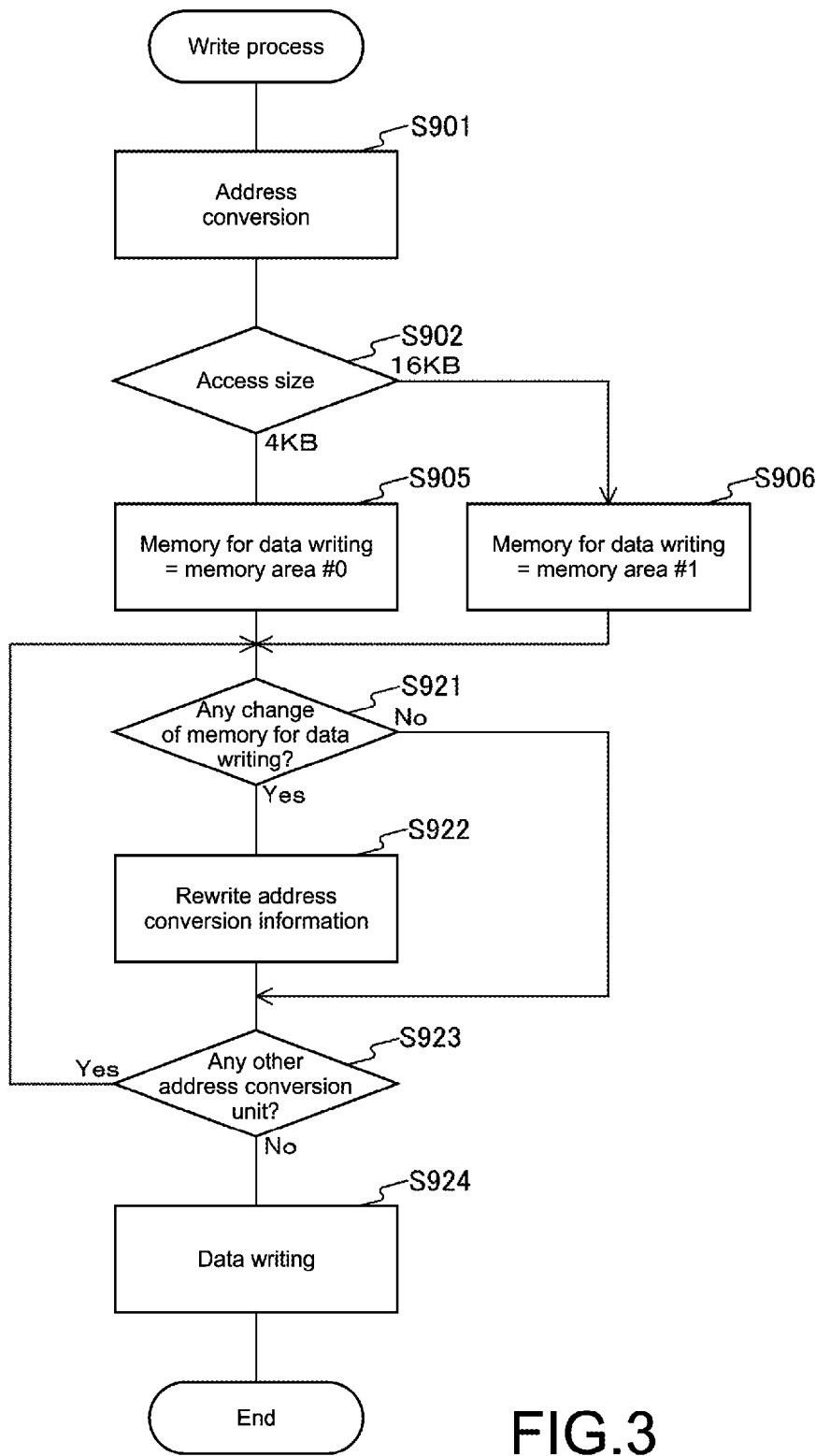
FIG. 3 is a diagram showing an exemplary procedure of a write process in the first embodiment of the present disclosure.

FIG. 3 is a diagram showing an exemplary procedure of a write process in the first embodiment of the present disclosure. Upon reception of a command asking for data writing from the host computer 100, the memory controller 200 starts the write process. First of all, the memory controller 200 converts a logical address in the command into a physical address (step S901). In the first embodiment, the address conversion unit is assumed to be 4 KB. Next, the memory controller 200 checks the access size, and when the access size is 4 KB (step S902: 4 KB), selects the memory area #0 for data writing (step S905). When the access size is 16 KB (step S902: 16 KB), the memory controller 200 selects the memory area #1 for data writing (step S906).

At this time, when the memory area selected in step S905 or S906 is the same as the memory area identified by the physical address, i.e., when the memory area for data writing has not been changed (step S921: No), the procedure goes to the next step (step S923). When the memory area for data writing has been changed (step S921: Yes), the memory controller 200 rewrites the address conversion information (step S922). That is, the memory controller 200 changes the physical address corresponding to the logical address in the command with a new memory area number and a new address. The memory area identified by the previous physical address is updated as being available for use.

When the access size exceeds the address conversion unit, and when there is another address conversion unit for use (step S923: Yes), the procedure repeats the process in step S921 and thereafter. When there is no other address conversion unit for use (step S923: No), the procedure goes to the next step. When the access size is changed from 4 KB to 16 KB, for example, rewriting of the address conversion information (step S922) is expected to be performed for four times because the new access size of 16 KB is four times larger than the address conversion unit of 4 KB. After the fourth rewriting of the address conversion information (step S922), the procedure goes from step S923 to S924. In step S924, the memory controller 200 issues a request to the memory module 300 for data writing (step S924), and then ends the write process.

In the first embodiment of the present disclosure, described is a processing time taken for the write process.

Figure 4A:
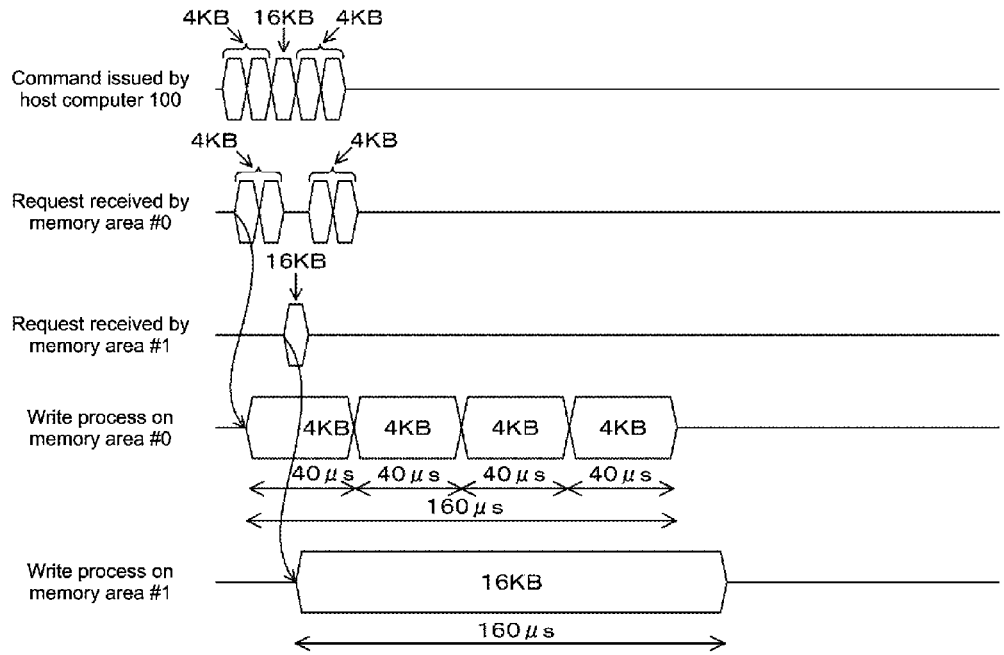
FIGS. 4A and 4B are each a timing chart of the write process in the first embodiment of the present disclosure.
Figure 4B:
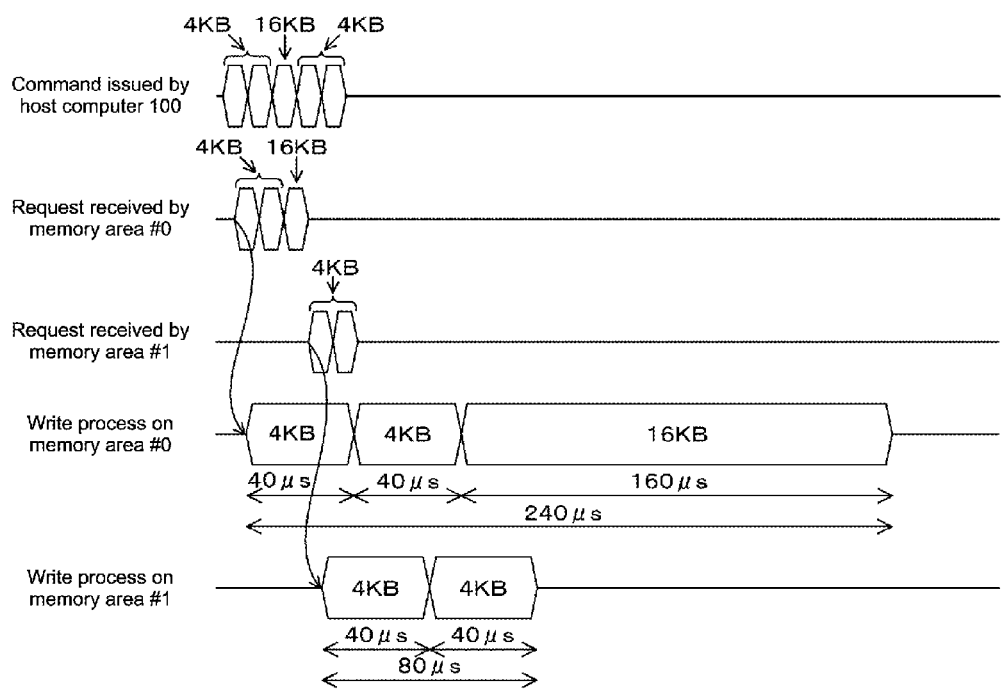

FIGS. 4A and 4B are each a timing chart of the write process in the first embodiment of the present disclosure. FIGS. 4A and 4B both show the relationship among commands, requests, and a processing time for the write process. Herein, the commands are those issued by the host computer 100, the requests are those respectively received by the memory areas #0 and #1 after the processing by the memory controller 200, and the processing time for the write process is one taken in each of the memory areas #0 and #1. FIG. 4A is specifically a timing chart when the write process in the first embodiment is performed. On the other hand, FIG. 4B is specifically a timing chart when the write process in the first embodiment is not performed. These commands and requests are all for asking for data writing, and "4 KB" and "16 KB" in the drawings each denote the access size of a command or others.

As to the commands issued by the host computer 100, the memory controller 200 directs the command with the access size of 4 KB to the memory area #0, and the command with the access size of 16 KB to the memory area #1. Assuming that the write speed of the memory chips is 100 MB/s, the time to be taken for writing of 4-KB and 16-KB data is respectively 40 µs and 160 µs. As is evident from the drawings, the time taken for the write process is 160 µs both in the memory areas #0 and #1. In comparison, the time taken for other processing, e.g., request issuing, and address conversion by the memory controller 200, is shorter than the time taken for the write process, and thus the entire processing time is also about 160 µs.

For comparison purposes, the case considered now is one without performing the access-size-based memory area allocation. In the timing chart of FIG. 4B, among the commands issued by the host computer 100, the first three commands are assigned to the memory area #0, and the remaining two commands are assigned to the memory area #1. As is evident from the drawing, the write process is performed mainly on the memory area #0, and the processing time takes 240 µs. This means that the processing time for all of the commands is also 240 µs, thereby resulting in a longer processing time than with the access-size-based memory area allocation.

[Read Process]

A read process is performed as below. That is, in a command issued by the host computer 100 for data reading, a logical address is converted into a physical address. Thereafter, a request is issued to a memory chip for data reading, which is identified by the memory area number in the physical address.

As described above, with the first embodiment of the present disclosure, the access size of a command asking for data writing is used as a basis for memory area allocation so that the processing time may not vary among the memory areas. This accordingly reduces the time for a write process with all of the commands.

2. Second Embodiment

Unlike in the above first embodiment performing the access-size-based memory area allocation on the memory module 300 including the two memory chips, in a second embodiment of the present disclosure, the access-size-based memory area allocation is performed on a memory module including four memory chips.

Figure 5:
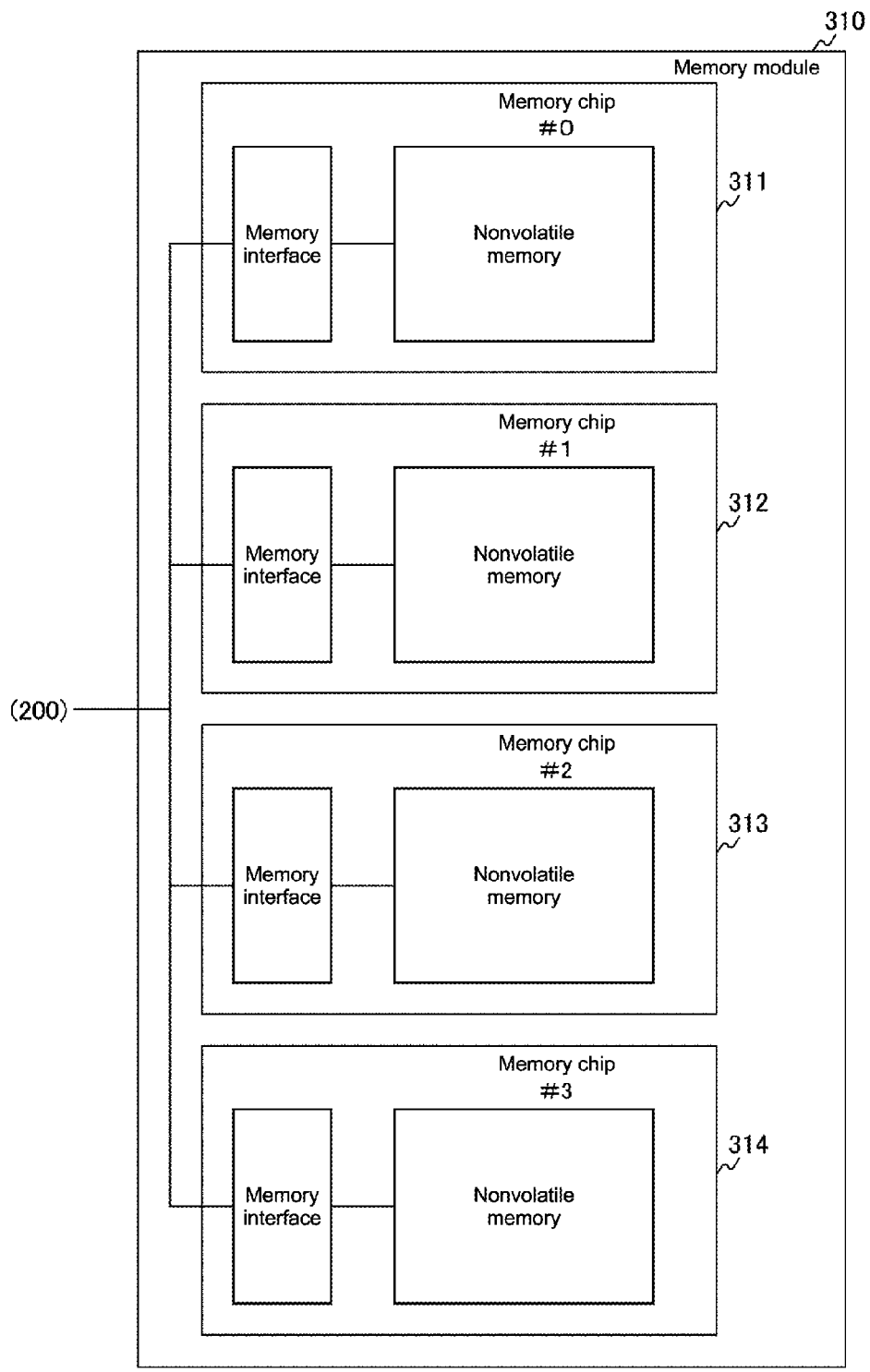
FIG. 5 is a diagram showing an exemplary configuration of a memory module in a second embodiment of the present disclosure.

FIG. 5 is a diagram showing an exemplary configuration of a memory module in the second embodiment of the present disclosure. A memory module 310 includes memory chips 311, 312, 313, and 314 that are of the same type. These memory chips may be equal to the memory chips 301 and 304 of FIG. 2, and are respectively assigned memory area numbers of #0, #1, #2, and #3. Other than these, the function configuration of the information processing system, the configuration of the memory controller, and others may be similar to those in the first embodiment.

[Memory Area Allocation]

In the second embodiment of the present disclosure, the access size includes 4 KB, 8 KB, 16 KB, and 32 KB. The access frequency is assumed to be 80%, 10%, 5%, and 5% with the respective access sizes. Using these, the memory occupation percentage is calculated. Therefore, the memory occupation percentage being the product of the access size and the access frequency shows the ratio of 4:1:1:2 in order of access size. For allowing the memory areas to have the same memory occupation percentage, the memory area allocation is performed as below. That is, the command with the access size of 4 KB is assigned to the memory chip 311 (memory area #0) and the memory chip 312 (memory area #1). The command with the access size of 8 KB or 16 KB is assigned to the memory chip 313 (memory area #2). A command with the access size of 32 KB is assigned to the memory chip 314 (memory area #3).

The command with the access size of 4 KB may be assigned to either of the memory areas #0 and #1. Therefore, the memory area allocation may be so performed as to prevent one of the memory areas from being mainly accessed. Specifically, the memory areas #0 and #1 may be allocated alternately for data writing if a change of access size causes a change of memory area from the memory areas #2 and #3 to the memory area #0 or #1. Such alternate allocation may prevent a specific memory area from being mainly accessed as described above. In this case, the control section 201 of the memory controller 200 is expected to include a buffer for storing the memory area numbers for such alternate allocation.

Described next is the operation of the memory controller 200 in the above second embodiment by referring to the drawing.

[Procedure of Write Process]

Figure 6:
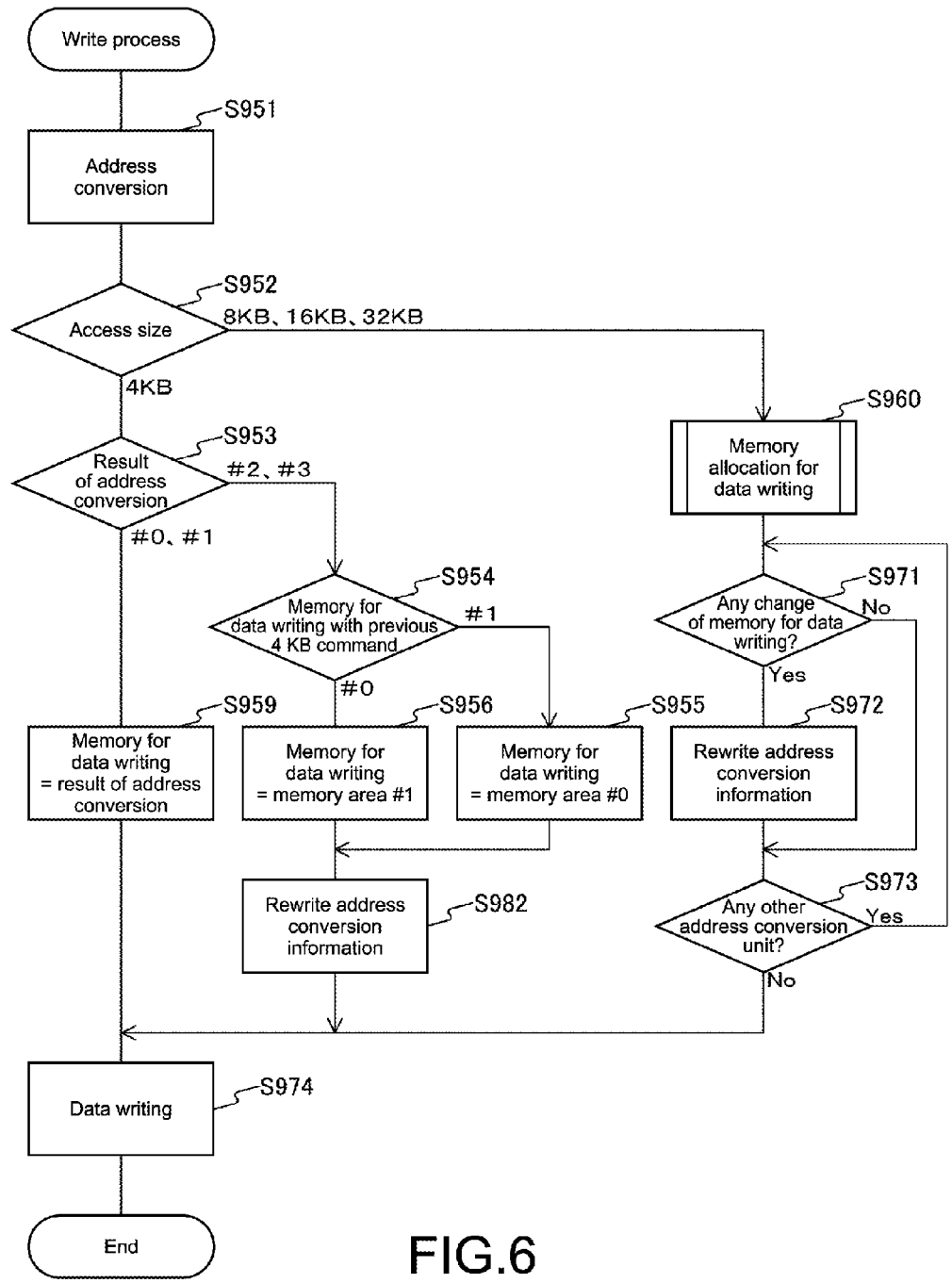
FIG. 6 is a diagram showing an exemplary procedure of a write process in the second embodiment of the present disclosure.

FIG. 6 is a diagram showing an exemplary procedure of a write process in the second embodiment of the present disclosure. Upon reception of a command asking for data writing from the host computer 100, the memory controller 200 starts the write process. First of all, the memory controller 200 converts a logical address in the command into a physical address (step S951). Next, the memory controller 200 checks the access size, and when the access size is 4 KB (step S952: 4 KB), the procedure goes to step S953. When the physical address being the result of the address conversion (step S951) identifies that the memory area #0 or #1 is for data writing (step S953: #0 or #1), the memory controller 200 does not change the memory area for data writing (step S959), and performs data writing (step S974).

In step S953, when the physical address identifies that the memory area #2 or #3 is for data writing (step S953: #2 or #3), this expects the memory area to be changed to #0 or #1, thereby performing the above-mentioned alternate allocation. That is, the memory controller 200 checks the buffer storing the memory area numbers for alternate allocation, and when the memory area previously allocated is #0 (step S954: #0), the memory area #1 is selected for data writing this time (step S956). When the memory area previously allocated is #1 (step S954: #1), the memory area #0 is selected for data writing this time (step S955). As above, the memory areas #0 and #1 are alternately allocated for data writing. The memory controller 200 then rewrites the address conversion information (step S982), and performs data writing (step S974).

In step S952, when the access size is 8 KB, 16 KB, or 32 KB (step S952: 8 KB, 16 KB, or 32 KB), a memory allocation process is performed (step S960) so as to select a memory area appropriate to the access size. When the memory area for data writing has been changed (step S971: Yes), the memory controller 200 rewrites the address conversion information (step S972). When the memory area for data writing has not been changed (step S971: No), the procedure goes to the next step. When there is another address conversion unit for use (step S973: Yes), the procedure repeats the process in step S971 and thereafter. When there is no other address conversion unit for use (step S973: No), data writing is performed (step S974). After the data writing, the write process is ended.

Figure 7:
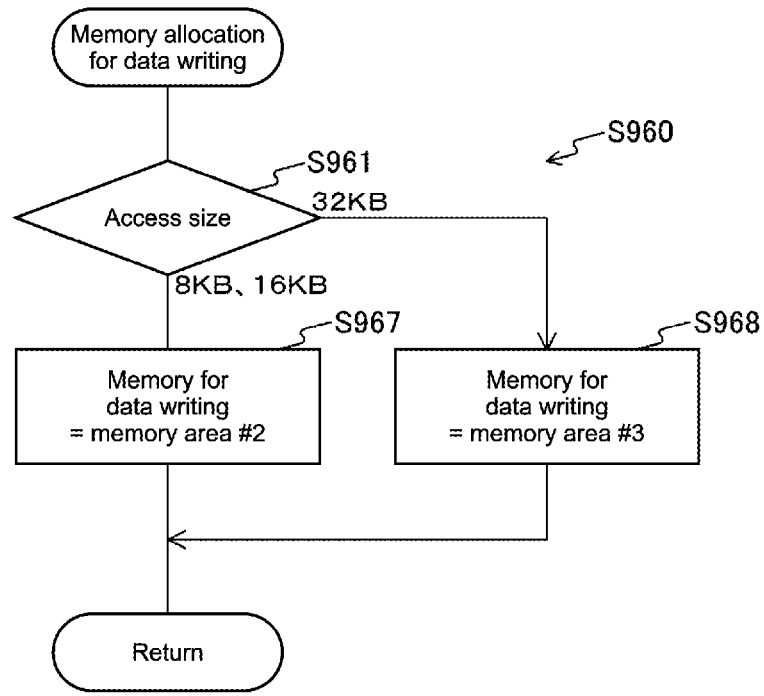
FIG. 7 is a diagram showing an exemplary procedure of a memory allocation process (step S960) in the second embodiment of the present disclosure.

FIG. 7 is a diagram showing an exemplary procedure of the memory allocation process (step S960) in the second embodiment of the present disclosure. When the access size is 8 KB or 16 KB (step S961: 8 KB or 16 KB), the memory area #2 is selected for data writing (step S967). When the access size is 32 KB (step S961: 32 KB), the memory area #3 is selected for data writing (step S968). The memory allocation process is then ended.

Herein, such alternate allocation is performed only when there is a change of memory area for a command to be assigned. Alternatively, the alternate allocation may be performed whenever a command with the access size of 4 KB is assigned to the memory area #0 or #1. This may also prevent a specific memory area from being mainly accessed.

As described above, in the second embodiment of the present disclosure, even with the four memory areas, memory area allocation is performed based on the access size of a command asking for data writing so that the processing time may not vary among the memory areas. Moreover, even if commands with the same access size are assigned to a plurality of memory areas, the alternate allocation may prevent any specific memory area from being mainly accessed.

3. Third Embodiment

Unlike in the above first embodiment performing the access-size-based memory area allocation on the memory module 300 including the two memory chips, in a third embodiment of the present disclosure, the access-size-based memory area allocation is performed on a memory module including a memory chip with two memory banks.

Figure 8:
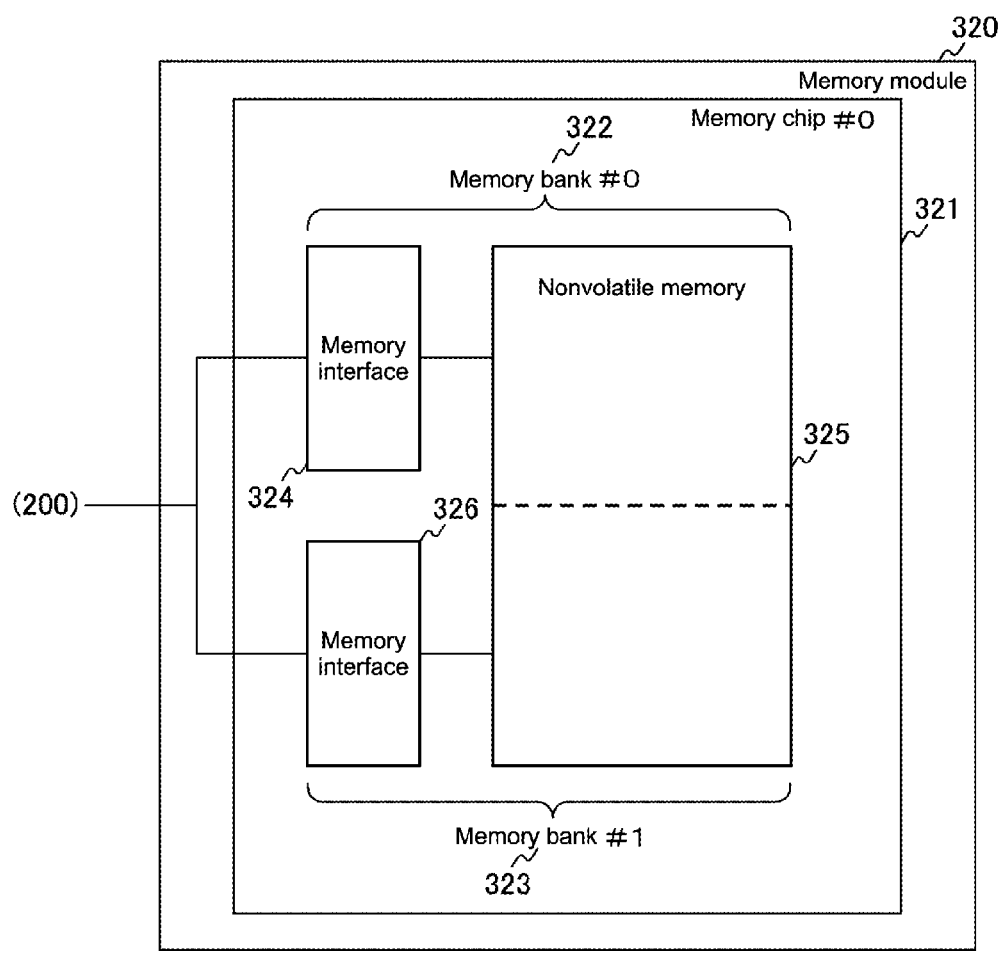
FIG. 8 is a diagram showing an exemplary configuration of a memory module in a third embodiment of the present disclosure.

FIG. 8 is a diagram showing an exemplary configuration of a memory module in the third embodiment of the present disclosure. A memory module 320 includes a memory chip 321 assigned a memory chip number of #0. The memory chip 321 includes memory interfaces 324 and 326, and a nonvolatile memory 325. The nonvolatile memory 325 is divided into two memory areas. These two memory areas are respectively connected to the memory interfaces 324 and 325, and configure memory banks 322 and 323. These memory banks are respectively assigned memory bank numbers of #0 and #1. Other than these, the function configuration of the information processing system, the configuration of the memory controller, and others may be similar to those in the first embodiment.

[Memory Area Allocation]

In the third embodiment of the present disclosure, the memory controller 200 uses the numbers assigned to the memory banks in the memory chip 321 as the memory area numbers.

Also in the third embodiment, the access size includes 4 KB, 8 KB, 16 KB, and 32 KB. The access frequency is assumed to be 80%, 10%, 5%, and 5% with the respective access sizes. Using these, the memory occupation percentage is calculated. Therefore, the memory occupation percentage being the product of the access size and the access frequency shows the ratio of 4:1:1:2 in order of access size. For allowing the memory areas to have the same memory occupation percentage, the memory area allocation is performed as below. That is, a command with the access size of 4 KB is assigned to the memory bank 322 (memory area #0). A command with the access size of 8 KB, 16 KB, or 32 KB is assigned to the memory bank 323 (memory area #1).

Described next is the operation of the memory controller 200 in the above third embodiment by referring to the drawing.

[Procedure of Write Process]

Figure 9:
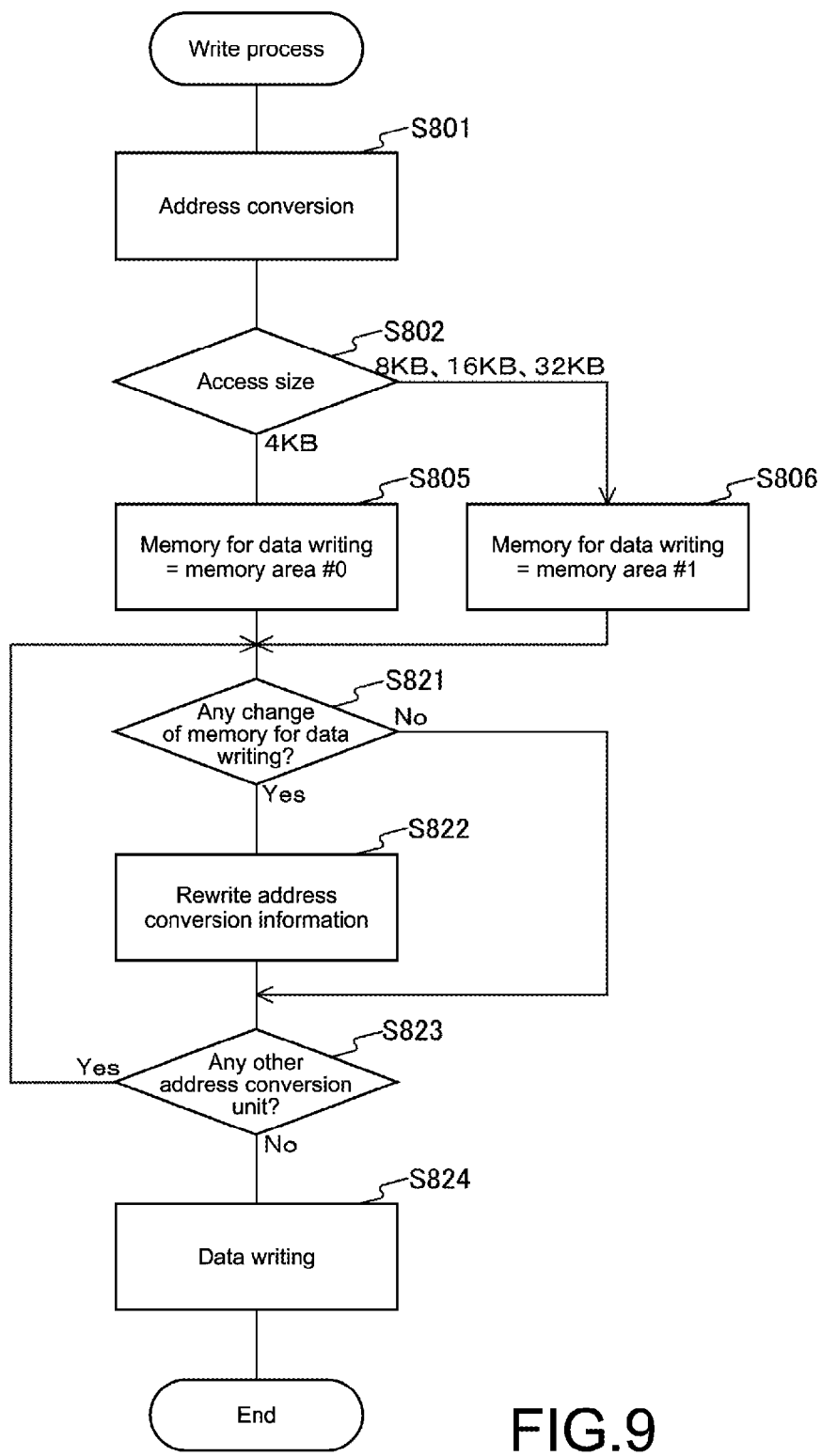
FIG. 9 is a diagram showing an exemplary procedure of a write process in the third embodiment of the present disclosure.

FIG. 9 is a diagram showing an exemplary procedure of a write process in the third embodiment of the present disclosure. Unlike the write process in the first embodiment described by referring to FIG. 3, the write process in this embodiment performs data writing to memory banks. Upon reception of a command asking for data writing from the host computer 100, the memory controller 200 starts the write process. First of all, the memory controller 200 performs address conversion (step S801). Next, the memory controller 200 checks the access size, and when the access size is 4 KB (step S802: 4 KB), the memory area #0 is selected for data writing (step S805). When the access size is other than 4 KB (step S802: 8 KB, 16 KB, or 32 KB), the memory area #1 is selected for data writing (step S806).

When the memory area for data writing has not been changed (step S821: No), the procedure goes to the next step (step S823). When the memory area for data writing has been changed (step S821: Yes), the memory controller 200 rewrites the address conversion information (step S822). When there is another address conversion unit for use (step S823: Yes), the procedure repeats the process in step S821 and thereafter. When there is no other address conversion unit for use (step S823: No), the memory controller 200 performs data writing (step S824), and then ends the write process.

As described above, in the third embodiment of the present disclosure, even when a memory chip is with two memory banks, memory area allocation for data writing is performed based on the access size of a command asking for data writing so that the processing time may not vary among the memory banks.

4. Fourth Embodiment

Unlike in the above third embodiment performing the access-size-based memory area allocation on the memory module 320 including a memory chip with two memory banks, in a fourth embodiment of the present disclosure, the access-size-based memory area allocation is performed on a memory module including two memory chips with two memory banks.

Figure 10:
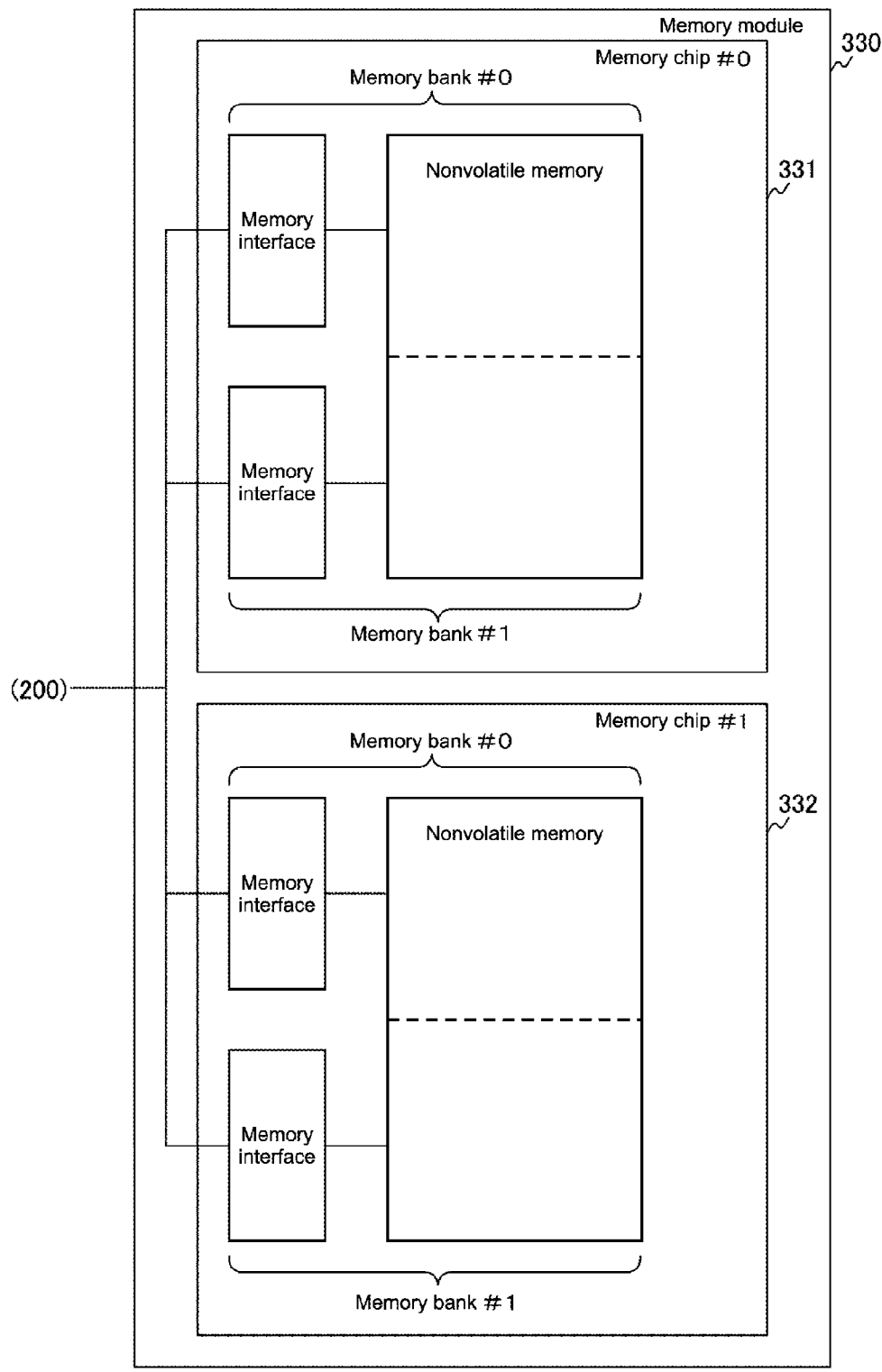
FIG. 10 is a diagram showing an exemplary configuration of a memory module in a fourth embodiment of the present disclosure.

FIG. 10 is a diagram showing an exemplary configuration of a memory module in the fourth embodiment of the present disclosure. A memory module 330 includes memory chips 331 and 332 in the same configuration. Alternatively, these memory chips 331 and 332 may be configured similarly to the memory chip 321 of FIG. 8. The memory chips 331 and 332 are respectively assigned memory chip numbers of #0 and #1. The memory banks in the memory chips 331 are respectively assigned memory bank numbers of #0 and #1. The same applies to the memory chip 332. Other than these, the function configuration of the information processing system, the configuration of the memory controller, and others may be similar to those in the first embodiment.

[Memory Area Allocation]

In the fourth embodiment of the present disclosure, the memory controller 200 assigns memory area numbers to the memory chips 331 and 332 and to the memory banks therein for management. To be specific, in the memory chip 331, the memory bank #0 is assigned a memory area number of #0, and the memory bank #1 is assigned a memory area number of #1. In the memory chip 332, the memory bank #0 is assigned a memory area number of #2, and the memory bank #1 is assigned a memory area number of #3.

Also in the fourth embodiment, the access size includes 4 KB, 8 KB, 16 KB, and 32 KB. The access frequency is assumed to be 80%, 10%, 5%, and 5% with the respective access sizes. These are the same as the access size and the access frequency defined in the second embodiment of the present disclosure. The memory area allocation is performed as below. That is, a command with the access size of 4 KB is assigned to the memory areas #0 and #1. A command with the access size of 8 KB or 16 KB is assigned to the memory area #2. A command with the access size of 32 KB is assigned to the memory area #3.

Described next is the operation of the memory controller 200 in the above fourth embodiment by referring to the drawing.

[Procedure of Write Process]

Figure 11:
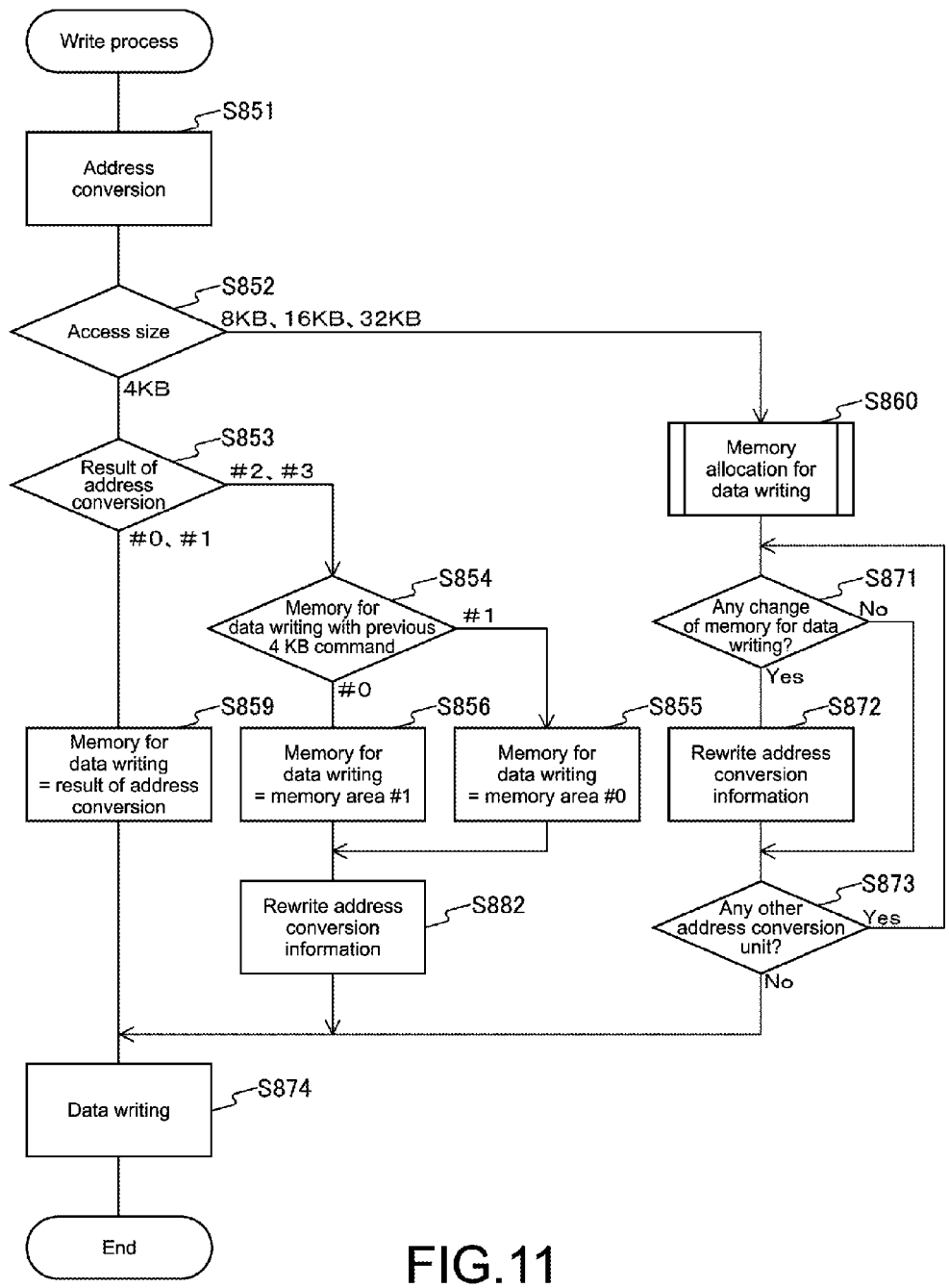
FIG. 11 is a diagram showing an exemplary procedure of a write process in the fourth embodiment of the present disclosure.

FIG. 11 is a diagram showing an exemplary procedure of a write process in the fourth embodiment of the present disclosure. Upon reception of a command asking for data writing from the host computer 100, the memory controller 200 starts the write process. First of all, the memory controller 200 performs address conversion (step S851). Next, the memory controller 200 checks the access size, and when the access size is 4 KB (step S852: 4 KB), the procedure goes to step S853. When the physical address identifies the memory area for data writing is #0 or #1 (step S853: #0 or #1), the memory controller 200 does not change the memory area (step S859), and performs data writing (step S874).

In step S853, when the physical address identifies the memory area for data writing is #2 or #3 (step S853: #2 or #3), the memory controller 200 performs alternate allocation. That is, the memory controller 200 checks the buffer storing memory areas for alternate allocation and bank numbers, and when the memory area previously allocated is #0 (step S854: #0), the memory area #1 is selected for data writing this time (step S856). When the memory area previously allocated is #1 (step S854: #1), the memory area #0 is selected for data writing this time (step S855). The memory controller 200 then rewrites the address conversion information (step S882), and performs data writing (step S874).

In step S852, when the access size is 8 KB, 16 KB, or 32 KB (step S852: 8 KB, 16 KB, or 32 KB), a memory allocation process is performed (step S860) so as to select a memory area appropriate to the access size. When the memory area has been changed (step S871: Yes), the memory controller 200 rewrites the address conversion information (step S872). When the memory area for data writing has not been changed (step S871: No), the procedure goes to the next step. When there is another address conversion unit for use (step S873: Yes), the procedure repeats the process in step S871 and thereafter.

When there is no other address conversion unit for use (step S873: No), data writing is performed (step S874). After the data writing, the write process is ended.

Figure 12:
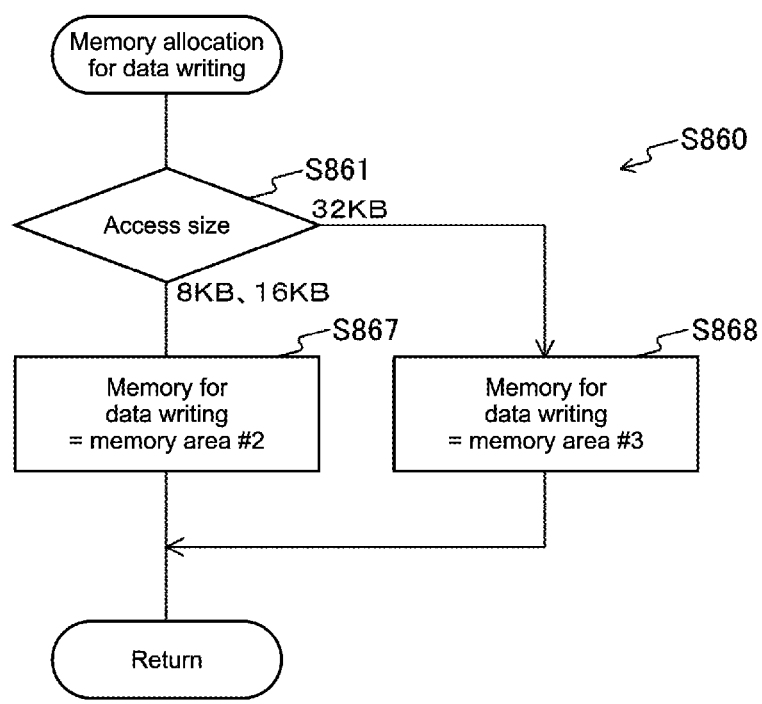
FIG. 12 is a diagram showing an exemplary procedure of a memory allocation process (step S860) in the fourth embodiment of the present disclosure.

FIG. 12 is a diagram showing an exemplary procedure of a memory allocation process (step S860) in the fourth embodiment of the present disclosure. When the access size is 8 KB or 16 KB (step S861: 8 KB or 16 KB), the memory area #2 is selected for data writing (Step S867). When the access size is 32 KB (step S861: 32 KB), the memory area #3 is selected for data writing (step S868). The memory allocation process is then ended.

As described above, in the fourth embodiment of the present disclosure, even with a memory module including two memory chips with two memory banks, memory area allocation for data writing may be performed based on the access size of a command asking for data writing so that the processing time may not vary among the memory areas. Moreover, even if commands with the same access size are assigned to a plurality of memory banks, the alternate allocation may prevent any specific memory bank from being mainly accessed.

5. Fifth Embodiment

Unlike in the above embodiments performing the access-size-based memory area allocation on a memory module including memory chips of the same type, in a fifth embodiment of the present disclosure, the access-size-based memory area allocation is performed on a memory module including two memory chips that are different in type.

Figure 13:
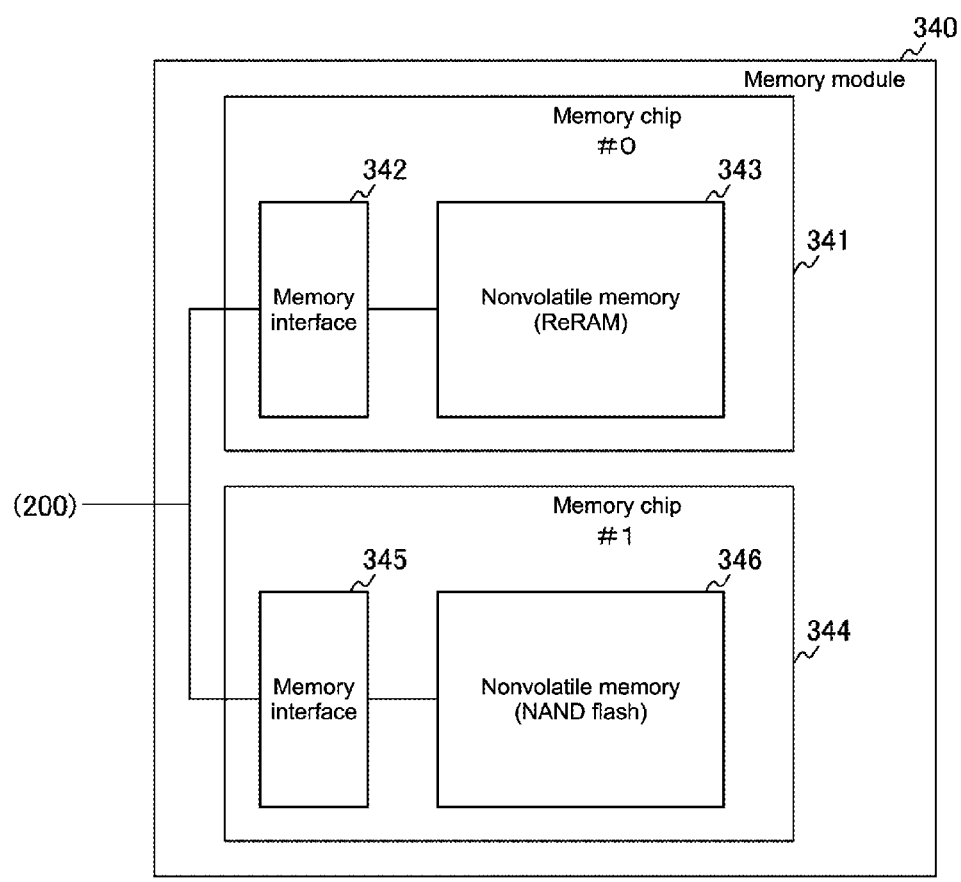
FIG. 13 is a diagram showing an exemplary configuration of a memory module in a fifth embodiment of the present disclosure.

FIG. 13 is a diagram showing an exemplary configuration of a memory module in the fifth embodiment of the present disclosure. A memory module 340 includes memory chips 341 and 344 that are different in type. These memory chips are respectively assigned memory area numbers of #0 and #1. The memory chip 341 includes a memory interface 342, and a nonvolatile memory 343. The memory chip 344 includes a memory interface 345, and a nonvolatile memory 346. The nonvolatile memory 343 is a ReRAM, and the nonvolatile memory 346 is a NAND flash memory. Other than these, the function configuration of the information processing system, the configuration of the memory controller, and others may be similar to those in the first embodiment.

[Memory Area Allocation]

In the fifth embodiment of the present disclosure, the access size includes 4 KB, 64 KB, 256 KB, and 512 KB. The access frequency is assumed to be 80%, 10%, 5%, and 5% with the respective access sizes. Using these, the memory occupation percentage is calculated. Therefore, the memory occupation percentage being the product of the access size and the access frequency shows the ratio of 1:2:4:8 in order of access size. For allowing the memory areas to have the same memory occupation percentage, the memory area allocation is performed as below. That is, a command with the access size of 4 KB, 64 KB, or 256 KB is assigned to one of the memory areas, and a command with the access size of 512 KB is assigned to the remaining memory area. This obtains the memory occupation percentage with the ratio of 7:8, which is substantially the same.

Since the memories in use are different in type, the memory area allocation is performed with consideration to the memory characteristics. The nonvolatile memory 343 in the memory area 341 is a ReRAM that has the characteristics of being available for high-speed data writing. On the other hand, the nonvolatile memory 346 in the memory area 344 is a NAND flash memory that has the characteristics of expecting block-basis erasing before data writing. In this example, used is a NAND flash memory with the block size of 512 KB. The NAND flash memory expects block-basis erasing even if the size of data for writing is smaller than the block size. The time for erasing is longer than the time for writing, and an increase of erase cycles causes a shorter memory life. For reducing the erase cycles to achieve data writing with a high efficiency, the size of data for writing may be made the same as the block size of 512 KB.

In consideration thereof, a command with the access size of 4 KB, 64 KB, or 256 KB is assigned to the memory chip 341 (memory area #0), and a command with the access size of 512 KB is assigned to the memory chip 344 (memory area #1).

The procedure of the write process is not described again as is similar to that in the above-mentioned embodiments.

In the fifth embodiment, the memory chip 341 is described to include the nonvolatile memory 343 being a ReRAM, but using a volatile memory such as DRAM may produce the same effect.

As described above, in the fifth embodiment of the present disclosure, even when two memories in use are different in type, the memory area allocation for data writing may be performed based on the access size of a command asking for data writing so that the processing time may not vary among the memory areas. Moreover, since the memory area allocation is performed with consideration to both the access size and the characteristics of the memories in use, the writing efficiency may be improved.

6. Sixth Embodiment

In the embodiments described above, the access frequency information has a specified value. On the other hand, in a sixth embodiment of the present disclosure, memory area allocation is performed dynamically in response to the access frequency that varies.

Figure 14:
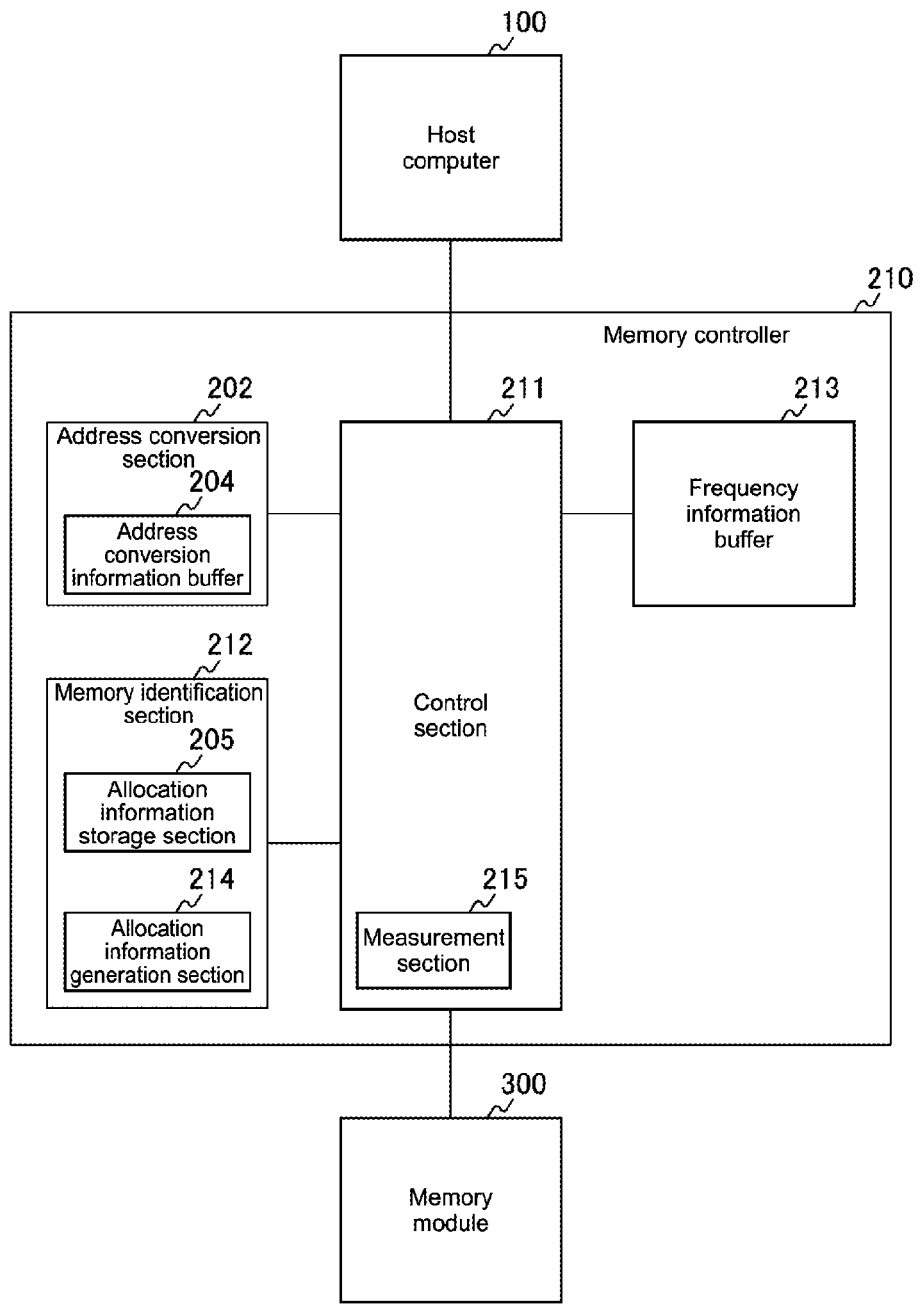
FIG. 14 is a diagram showing an exemplary function configuration of an information processing system in a sixth embodiment of the present disclosure.

FIG. 14 is a diagram showing an exemplary function configuration of an information processing system in the sixth embodiment of the present disclosure. A memory controller 210 includes an address conversion section 202, a control section 211, a memory identification section 212, and a frequency information buffer 213. The control section 211 includes a measurement section 215. The measurement section 215 measures the access frequency information.

The memory identification section 212 includes an allocation information storage section 205, and an allocation information generation section 214. The allocation information generation section 214 generates allocation information based on the access size and the access frequency information. This allocation information is stored in the allocation information storage section 205.

The frequency information buffer 213 stores the access frequency information obtained by the measurement section 215.

The measurement section 215 is an example of a measurement section claimed in Claims. The allocation information generation section 214 is an example of an allocation information generation section claimed in Claims. The frequency information buffer 213 is an example of a frequency information buffer claimed in Claims. The remaining components, i.e., the host computer 100, the address conversion section 202, and the memory module 300, are in the configuration similar to those in the information processing apparatus in FIG. 1.

Described next is the operation of the memory controller 210 in the above sixth embodiment by referring to the drawing.

[Procedure of Write Process]

Figure 15:
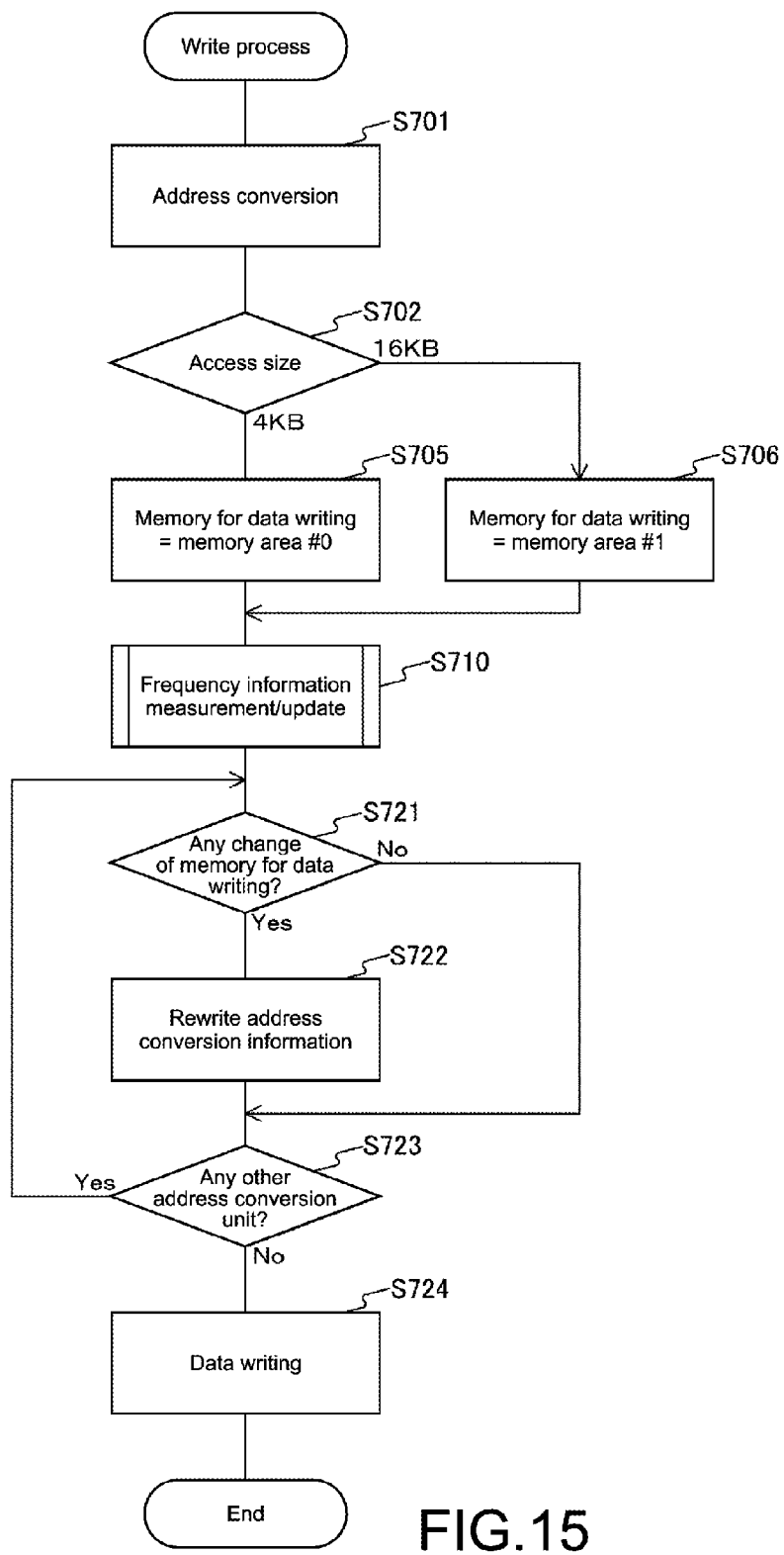
FIG. 15 is a diagram showing an exemplary procedure of a write process in the sixth embodiment of the present disclosure.

FIG. 15 is a diagram showing an exemplary procedure of a write process in the sixth embodiment of the present disclosure. Unlike in the write process in the first embodiment described by referring to FIG. 3, the write process in this embodiment measures and updates the access frequency information. Upon reception of a command asking for data writing from the host computer 100, the memory controller 210 starts the write process. First of all, the memory controller 210 converts a logical address in the command into a physical address (step S701). Next, the memory controller 210 checks the access size, and when the access size is 4 KB (step S702: 4 KB), selects the memory area #0 for data writing (step S705). When the access size is 16 KB (step S702: 16 KB), the memory controller 210 selects the memory area #1 for data writing (step S706). Thereafter, the memory controller 210 performs a frequency information measurement/update process (step S710).

When the memory area for data writing has not been changed (step S721: No), the procedure goes to the next step (step S723). When the memory area for data writing has been changed (step S721: Yes), the memory controller 210 rewrites the address conversion information (step S722). When there is another address conversion unit for use (step S723: Yes), the procedure repeats the process in step S721 and thereafter. When there is no other address conversion unit for use (step S723: No), the memory controller 210 performs data writing (step S724), and then ends the write process.

[Procedure of Frequency Information Measurement/Update Process]

Figure 16:
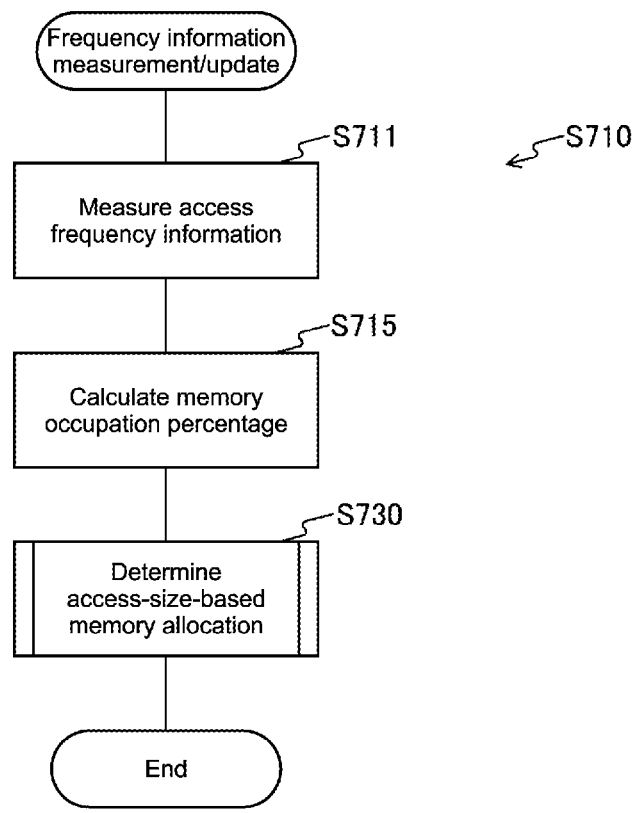
FIG. 16 is a diagram showing an exemplary procedure of a frequency information measurement/update process in the sixth embodiment of the present disclosure.

FIG. 16 is a diagram showing an exemplary procedure of a frequency information measurement/update process in the sixth embodiment of the present disclosure. The measurement section 215 measures how often a command asking for data writing is received for each access size. The obtained result is then divided by the total number of commands asking for data writing, thereby generating the access frequency information (step S711). The measurement section 215 then makes the frequency information buffer 213 store the access frequency information. The allocation information generation section 214 calculates the memory occupation percentage based on the access frequency information (step S715). Thereafter, an allocation determination process is performed for every access size (step S730), and this is the end of the frequency information measurement/update process.

In the sixth embodiment of the present disclosure, the memory module 300 is used similarly to the first embodiment, and thus the number of the memory areas is two. The access size includes 4 KB and 16 KB. The above-mentioned access frequency is assumed to be 80% with the access size of 4 KB, and to be 20% with the access size of 16 KB similarly to the first embodiment. With these, the memory occupation percentage is 3.2 K for both of the access sizes of 4 KB and 16 KB.

[Allocation Determination Process]

Figure 17:
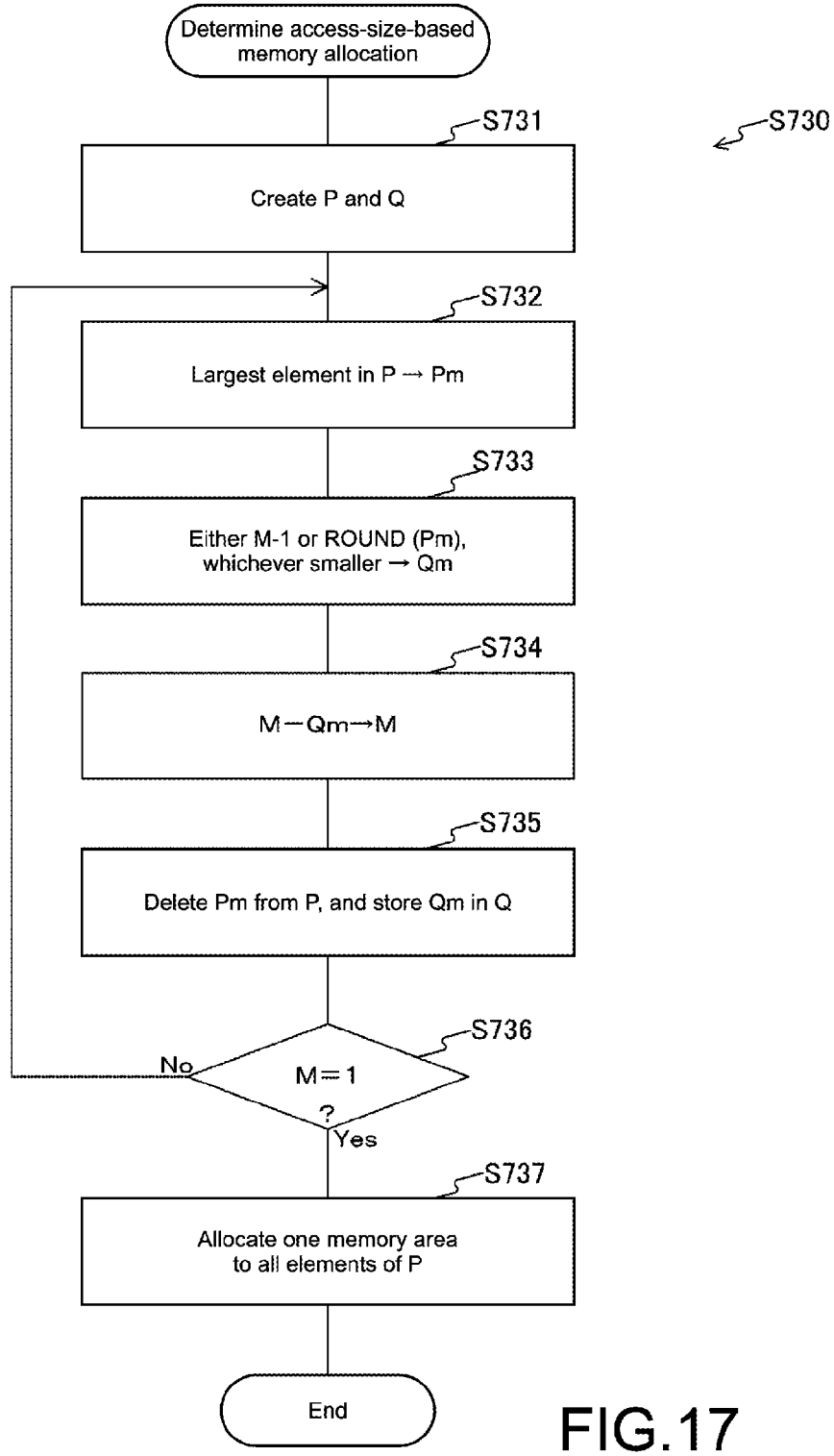
FIG. 17 is a diagram showing an exemplary procedure of an access-size-based allocation determination process in the sixth embodiment of the present disclosure.

FIG. 17 is a diagram showing an exemplary procedure of the allocation determination process based on an access size in the sixth embodiment of the present disclosure. The allocation information generation section 214 generates allocation information based both on the access size, and the access frequency information stored in the frequency information buffer 213.

First of all, calculated is p in Equation below for each access unit using the memory occupation percentage.

$$P_n = M \times S_n / \Sigma S_n (n=1,2,3, \text{ and others})$$

In Equation above, $P_n$ denotes a provisional allocation number with each access size, $S_n$ denotes the memory occupation percentage with each access size, $\Sigma S_n$ denotes the total sum of the memory occupation percentage with each access size, and M denotes the number of memory areas.

Next, created is an array $P[p_1, p_2, p_3 \ldots]$ including elements of $P_n$, and an array Q (step S731). Herein, the array Q is for storing the calculation results of the allocation number with each access size, and includes elements as many as those in the array P. Applying these in the sixth embodiment obtains as below with M=2.

$$S_1 = 4\ K \times 0.8 = 3.2\ K$$

$$S_2 = 16\ K \times 0.2 = 3.2\ K$$

$$\Sigma S_n = 3.2\ K + 3.2\ K = 6.4\ K$$

$$p_1 = 2 \times 3.2\ K / 6.4\ K = 1$$

$$p_2 = 2 \times 3.2\ K / 6.4\ K = 1$$

$$P = [1,1]$$

$$Q = [,]$$

In the initial state, the array Q includes two null elements.

In the array P, the largest element is stored as a variable Pm. At this time, an index n is also stored (step S732). Either M−1 or ROUND (Pm), whichever smaller is stored as a variable Qm (step S733). Herein, Round (Pm) is a value obtained by rounding off Pm (to the nearest ten). Thereafter, M-Qm is stored as M (step S734). From the array P, Pm is deleted, and Qm is stored as an element as the index n in the array Q (step S735). When M is not 1 (step S736: No), the procedure repeats the process in step S732 and thereafter. When M is 1 (step S736: Yes), the elements remained in the array P (access sizes) are collectively assigned to a memory area (step S737). The number of memory areas for allocation with each of any other access sizes is obtained as a value stored at the corresponding element in the array Q.

In accordance with the above-mentioned number of memory areas for allocation, the memory area allocation is performed based on the access size, e.g., based on the access size in ascending order of the memory area number. The allocation information is generated as above. The access-size-based allocation determination process is then ended.

In the sixth embodiment, as a result, a command with the access size of 4 KB is assigned to the memory area 301 (memory area #0), and a command with the access size of 16 KB is assigned to the memory area 304 (memory area #1).

As described above, in the sixth embodiment of the present disclosure, the measurement section 215 measures and updates the access frequency information. Therefore, even when the access frequency information is changed, the allocation information may be dynamically changed.

7. Seventh Embodiment

In the embodiments described above, the memory controller is in charge of measuring the access frequency information. On the other hand, in a seventh embodiment of the present disclosure, a host computer is in charge of measuring the access frequency information, and the resulting access frequency information is sent to a memory controller.

Figure 18:
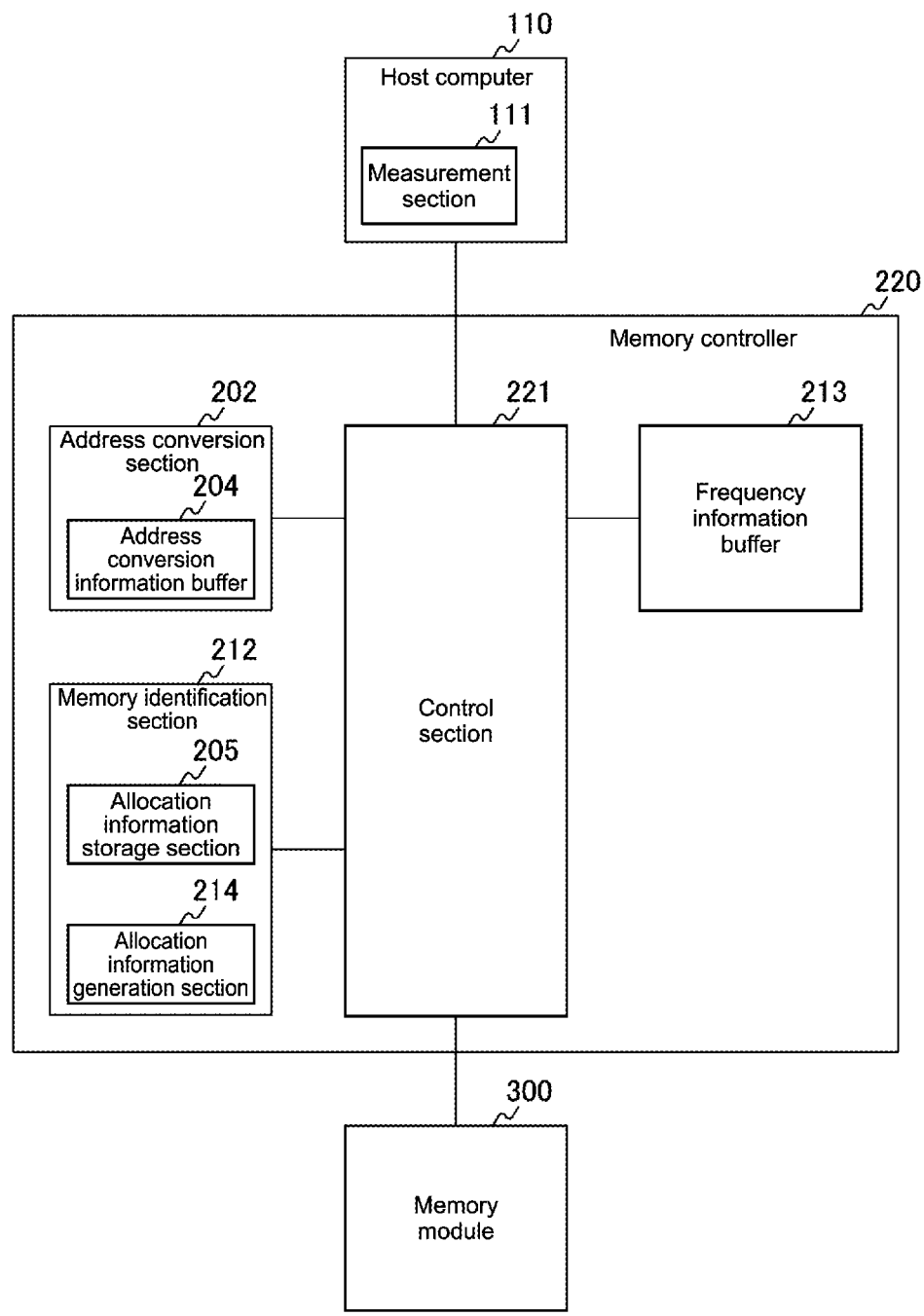
FIG. 18 is a diagram showing an exemplary function configuration of an information processing system in a seventh embodiment of the present disclosure.

FIG. 18 is a diagram showing an exemplary function configuration of an information processing system in the seventh embodiment of the present disclosure. A host computer 110 includes a measurement section 111.

A memory controller 220 includes an address conversion section 202, a control section 221, a memory identification section 212, and a frequency information buffer 213.

When issuing a command asking the memory controller 220 for data writing, the host computer 110 measures the access frequency information. This is performed by the measurement section 111. The obtained access frequency information is sent to the memory controller 220, and then is sent by the control section 221 in the memory controller 220 to the frequency information buffer 213 for storage therein.

Note that the measurement section 111 is an example of a measurement section claimed in Claims. The address conversion section 202 and the memory module 300 may be in the configuration similar to those in the information processing apparatus of FIG. 1.

[Memory Allocation Process]

Figure 19:
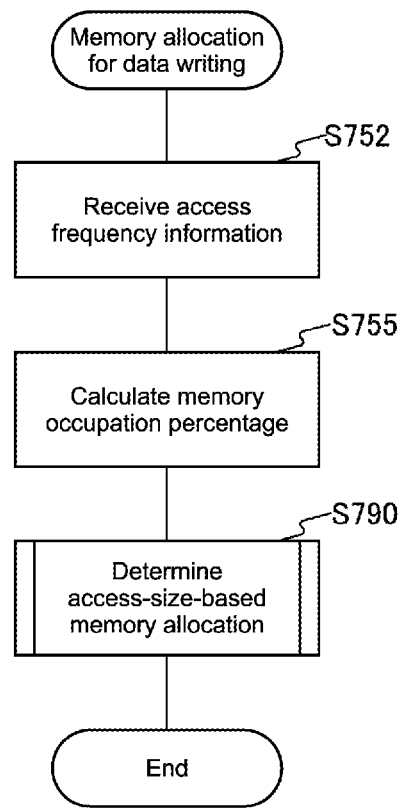
FIG. 19 is a diagram showing an exemplary procedure of a memory allocation process in the seventh embodiment of the present disclosure.

FIG. 19 is a diagram showing an exemplary procedure of a memory allocation process in the seventh embodiment of the present disclosure. The measurement section 111 measures how often a command asking for data writing is generated for each access size, and generates the access frequency information. The resulting access frequency information is then sent to the memory controller 220. The control section 221 in the memory controller 220 receives the access frequency information (step S752) for storage in the frequency information buffer 213. Based on the access frequency information, the allocation information generation section 214 calculates the memory occupation percentage (step S755). Thereafter, the access-size-based allocation determination process is performed (step S790), thereby updating the allocation information. The processes in steps S755 and S790 are similar to those in steps S715 and S730 described above by referring to FIG. 16, and thus are not described again. The write process is not described again as is similar to that described above by referring to FIG. 15.

As described above, in the seventh embodiment of the present disclosure, the access frequency information obtained on the host computer 110 side is sent to the memory controller, and then the allocation information is updated. In this manner, even when the access frequency information is changed, the allocation information may be dynamically changed.

8. Modified Example

Example of Reading Access Frequency Information from Nonvolatile Memory

In the sixth embodiment of the present disclosure, the access frequency information is described as being stored in the frequency information buffer, but alternatively, may be stored in the memory module 300 when the system stops operating, for example. If this is the case, the access frequency information is expected to be read from the memory module 300 when the system starts operating. Described below is a procedure in such a case.

Figure 20:
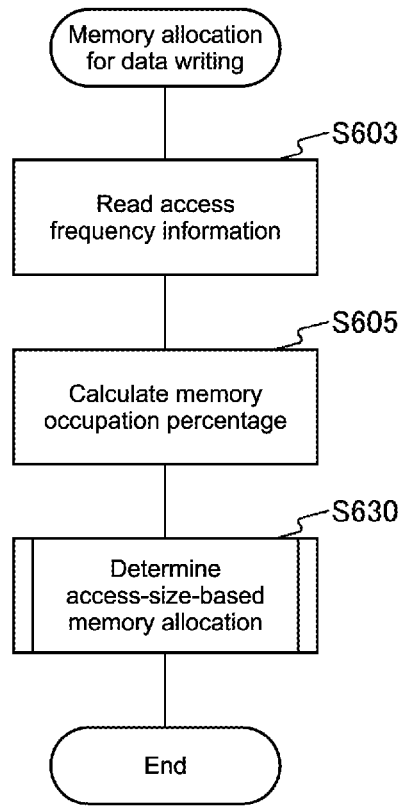
FIG. 20 is a diagram showing an exemplary procedure of a memory allocation process in a modified example of the sixth embodiment of the present disclosure.

FIG. 20 is a diagram showing an exemplary procedure of a memory allocation process when a system starts operating. At the startup of the system, the control section 221 in the memory controller 210 reads the access frequency information from the nonvolatile memory in the memory module 300 (step S603) for storage in the frequency information buffer 213. Based on the access frequency information, the allocation information generation section 214 calculates the memory occupation percentage (step S605). Thereafter, the access-size-based allocation determination process is performed (step S630), thereby updating the allocation information. The processes in steps S605 and S630 are similar to those in steps S715 and S730 described above by referring to FIG. 16, and thus are not described twice.

With the process described above, the access frequency information becomes available for continued use at the startup of the system with the updated measurement result obtained by the measurement section 215.

Therefore, with the modified example of the sixth embodiment, even when the system stops or starts operating, the allocation information remains dynamically updated to respond to a change of access frequency.

As described above, according to the embodiments of the present disclosure, even if a host computer issues a plurality of commands with various access sizes for data writing, the processing time may not vary among the memory areas. This accordingly reduces the processing time taken for a write process with all of the commands issued by the host computer.

The embodiments described above are by way of examples only, and the matters in the embodiments have correspondences with the matters claimed in Claims to specify the present disclosure. Similarly, the matters claimed in Claims to specify the present disclosure have correspondences with the matters in the embodiments of the present disclosures under the same designations. While the present disclosure has been described in detail, the foregoing description is in all aspects illustrative and not restrictive. It is understood that numerous other modifications and variations can be devised without departing from the scope of the present disclosure.

Moreover, the procedures described in the above embodiments may be a method including these procedures, or a program causing a computer to execute the procedures, or a recording medium for recording of the program. The recording medium may be a CD (Compact Disc), an MD (Mini-Disc), a DVD (Digital Versatile Disc), a memory card, or a Blu-ray (trade mark) Disc, for example.

While the effect has been described, the foregoing description is in all aspects illustrative and not restrictive. It is understood that any other effect may be produced.

The present disclosure may be also in the following structures.

(1) A memory controller, including:
an address conversion information buffer configured to store address conversion information, the address conversion information being about a correlation between a logical address and a physical address, the physical address including a number of a memory area for data writing;
an address conversion section configured to convert the logical address into the physical address in accordance with the address conversion information, the logical address being included in a command issued by a host computer;
an allocation information storage section configured to store allocation information, the allocation information indicating a correlation between an access size and the number of the memory area for the data writing;
a memory identification section configured to output the number of the memory area for the data writing in accordance with the allocation information, the number of the memory area corresponding to the access size in the command; and
a control section configured to, when the number of the memory area in the physical address is different from the number of the memory area provided by the memory identification section, perform the data writing to the memory area identified by the memory identification section.

(2) The memory controller according to (1), further including:
a frequency information buffer configured to store access frequency information, the access frequency information indicating an access frequency with each access size; and
an allocation information generation section configured to generate the allocation information for storage in the allocation information storage section, the allocation information being generated based on the access size and the access frequency information.

(3) The memory controller according to (2), further including
a measurement section configured to generate the access frequency information for storage in the frequency information buffer, the access frequency information being generated by measuring an access-size-based command ratio with respect to a total number of the command and a plurality of commands asking for the data writing.

(4) A storage apparatus, including:
a memory module including a plurality of memory areas; and
a memory controller including
an address conversion information buffer configured to store address conversion information, the address conversion information being about a correlation between a logical address and a physical address, the physical address including a number of any of the memory areas,
an address conversion section configured to convert the logical address into the physical address in accordance with the address conversion information, the logical address being included in a command issued by the host computer,
an allocation information storage section configured to store allocation information, the allocation information indicating a correlation between an access size and the number of each of the memory areas,
a memory identification section configured to output any of the numbers of the memory areas in accordance with the allocation information, the number of the memory area corresponding to the access size in the command, and
a control section configured to, when the number of the memory area in the physical address is different from the number of the memory area provided by the memory identification section, perform data writing to the memory area identified by the memory identification section.

(5) An information processing system, including:
a memory module including a plurality of memory areas;
a host computer configured to issue a command to a memory controller; and
the memory controller including
an address conversion information buffer configured to store address conversion information, the address conversion information being about a correlation between a logical address and a physical address, the physical address including a number of any of the memory areas,
an address conversion section configured to convert the logical address into the physical address in accordance with the address conversion information, the logical address being included in the command issued by the host computer, an allocation information storage section configured to store allocation information, the allocation information indicating a correlation between an access size and the number of each of the memory areas, a memory identification section configured to output any of the numbers of the memory areas in accordance with the allocation information, the number of the memory area corresponding to the access size in the command issued by the host computer, a control section configured to, when the number of the memory area in the physical address is different from the number of the memory area provided by the memory identification section, perform data writing to the memory area identified by the memory identification section.

(6) The information processing system according to (5), in which the memory controller further includes a frequency information buffer configured to store access frequency information, the access frequency information indicating an access frequency with each of the access size and a plurality of access sizes, an allocation information generation section configured to generate the allocation information for storage in the allocation information storage section, the allocation information being generated based on the access sizes and the access frequency information, and a measurement section configured to generate the access frequency information for storage in the frequency information buffer, the access frequency information being generated by measuring an access-size-based command ratio with respect to a total number of the command and a plurality of commands asking for the data writing.

(7) The information processing system according to (5), in which the memory controller further includes a frequency information buffer configured to store access frequency information, the access frequency information indicating an access frequency with each of the access size and a plurality of access sizes, and an allocation information generation section configured to generate the allocation information for storage in the allocation information storage section, the allocation information being generated based on the access sizes and the access frequency information, and the host computer includes a measurement section configured to generate the access frequency information for storage in the frequency information buffer, the access frequency information being generated by measuring an access-size-based command ratio with respect to a total number of the command and a plurality of commands asking for the data writing.

(8) A memory control method, including:

converting a logical address into a physical address in accordance with address conversion information, the address conversion information being about a correlation between the logical address and the physical address, the physical address including a number of a memory area for data writing, the logical address being included in a command issued by a host computer;

outputting the number of the memory area for the data writing in accordance with allocation information, the allocation information indicating a correlation between an access size and the number of the memory area for the data writing, the number of the memory area corresponding to the access size in the command; and performing, when the number of the memory area in the physical address is different from the number of the memory area in the output, the data writing to the memory area identified by the output.

It should be understood by those skilled in the art that various modifications, combinations, sub-combinations and alterations may occur depending on design requirements and other elements insofar as they are within the scope of the appended claims or the equivalents thereof.

What is claimed is:

1. A memory controller, comprising:

an address conversion information buffer configured to store address conversion information, the address conversion information being about a correlation between a logical address and a physical address, the physical address including a number of a memory area for data writing;

an address conversion section configured to convert the logical address into the physical address in accordance with the address conversion information, the logical address being included in a command issued by a host computer;

an allocation information storage section configured to store allocation information, the allocation information indicating a correlation between an access size and the number of the memory area for the data writing;

a memory identification section configured to output the number of the memory area for the data writing in accordance with the allocation information, the number of the memory area corresponding to the access size in the command; and a control section configured to, when the number of the memory area in the physical address is different from the number of the memory area provided by the memory identification section, perform the data writing to the memory area identified by the memory identification section.

2. The memory controller according to claim 1, further comprising:

a frequency information buffer configured to store access frequency information, the access frequency information indicating an access frequency with each access size; and an allocation information generation section configured to generate the allocation information for storage in the allocation information storage section, the allocation information being generated based on the access size and the access frequency information.

3. The memory controller according to claim 2, further comprising a measurement section configured to generate the access frequency information for storage in the frequency information buffer, the access frequency information being generated by measuring an access-size-based command ratio with respect to a total number of the command and a plurality of commands asking for the data writing.

4. A storage apparatus, comprising:

a memory module including a plurality of memory areas; and a memory controller including an address conversion information buffer configured to store address conversion information, the address conversion information being about a correlation between a logical address and a physical address, the physical address including a number of any of the memory areas, an address conversion section configured to convert the logical address into the physical address in accordance with the address conversion information, the logical address being included in a command issued by the host computer, an allocation information storage section configured to store allocation information, the allocation information indicating a correlation between an access size and the number of each of the memory areas, a memory identification section configured to output any of the numbers of the memory areas in accordance with the allocation information, the number of the memory area corresponding to the access size in the command, and a control section configured to, when the number of the memory area in the physical address is different from the number of the memory area provided by the memory identification section, perform data writing to the memory area identified by the memory identification section.

5. An information processing system, comprising:

a memory module including a plurality of memory areas;

a host computer configured to issue a command to a memory controller; and the memory controller including an address conversion information buffer configured to store address conversion information, the address conversion information being about a correlation between a logical address and a physical address, the physical address including a number of any of the memory areas, an address conversion section configured to convert the logical address into the physical address in accordance with the address conversion information, the logical address being included in the command issued by the host computer, an allocation information storage section configured to store allocation information, the allocation information indicating a correlation between an access size and the number of each of the memory areas, a memory identification section configured to output any of the numbers of the memory areas in accordance with the allocation information, the number of the memory area corresponding to the access size in the command issued by the host computer, a control section configured to, when the number of the memory area in the physical address is different from the number of the memory area provided by the memory identification section, perform data writing to the memory area identified by the memory identification section.

6. The information processing system according to claim 5, wherein the memory controller further includes a frequency information buffer configured to store access frequency information, the access frequency information indicating an access frequency with each of the access size and a plurality of access sizes, an allocation information generation section configured to generate the allocation information for storage in the allocation information storage section, the allocation information being generated based on the access sizes and the access frequency information, and a measurement section configured to generate the access frequency information for storage in the frequency information buffer, the access frequency information being generated by measuring an access-size-based command ratio with respect to a total number of the command and a plurality of commands asking for the data writing.

7. The information processing system according to claim 5, wherein the memory controller further includes a frequency information buffer configured to store access frequency information, the access frequency information indicating an access frequency with each of the access size and a plurality of access sizes, and an allocation information generation section configured to generate the allocation information for storage in the allocation information storage section, the allocation information being generated based on the access sizes and the access frequency information, and the host computer includes a measurement section configured to generate the access frequency information for storage in the frequency information buffer, the access frequency information being generated by measuring an access-size-based command ratio with respect to a total number of the command and a plurality of commands asking for the data writing.

8. A memory control method, comprising:

converting a logical address into a physical address in accordance with address conversion information, the address conversion information being about a correlation between the logical address and the physical address, the physical address including a number of a memory area for data writing, the logical address being included in a command issued by a host computer;

outputting the number of the memory area for the data writing in accordance with allocation information, the allocation information indicating a correlation between an access size and the number of the memory area for the data writing, the number of the memory area corresponding to the access size in the command; and performing, when the number of the memory area in the physical address is different from the number of the memory area in the output, the data writing to the memory area identified by the output.

* * * * *